US008793185B1

(12) United States Patent
Hollier et al.

(10) Patent No.: US 8,793,185 B1
(45) Date of Patent: Jul. 29, 2014

(54) SYSTEM AND METHOD FOR SECURING INFORMATION DISTRIBUTION VIA EMAIL

(75) Inventors: Ian V. Hollier, Kent, WA (US); Michael L. Waterston, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1124 days.

(21) Appl. No.: 09/930,791

(22) Filed: Aug. 16, 2001

Related U.S. Application Data

(63) Continuation of application No. 09/751,436, filed on Dec. 29, 2000, now Pat. No. 7,827,102, which is a continuation of application No. 09/556,064, filed on Apr. 21, 2000, now abandoned.

(51) Int. Cl.
*G06Q 40/00* (2012.01)

(52) U.S. Cl.
USPC ............... 705/40; 705/26; 705/27; 705/42

(58) Field of Classification Search
USPC .......................... 705/42, 26, 27, 40
See application file for complete search history.

(56) References Cited

U.S. PATENT DOCUMENTS

| | | | |
|---|---|---|---|
| 5,649,116 A | | 7/1997 | McCoy et al. |
| 5,903,881 A * | | 5/1999 | Schrader et al. ............... 705/42 |
| 5,963,915 A * | | 10/1999 | Kirsch ........................ 705/26.8 |
| 5,963,925 A * | | 10/1999 | Kolling et al. ................. 705/40 |
| 5,964,891 A * | | 10/1999 | Caswell et al. ................ 714/31 |
| 5,983,200 A | | 11/1999 | Slotznick |
| 6,016,484 A * | | 1/2000 | Williams et al. ................ 705/39 |
| 6,049,784 A | | 4/2000 | Weatherly et al. |
| 6,401,079 B1 | | 6/2002 | Kahn et al. |
| 6,442,529 B1 | | 8/2002 | Krishan et al. |
| 6,629,081 B1 | | 9/2003 | Cornelius et al. |
| 6,678,664 B1 | | 1/2004 | Ganesan |
| 6,721,783 B1 * | | 4/2004 | Blossman et al. ............ 709/206 |
| 2002/0131561 A1 * | | 9/2002 | Gifford et al. ................ 379/67.1 |
| 2002/0154210 A1 * | | 10/2002 | Ludwig et al. ............ 348/14.08 |
| 2002/0169795 A1 * | | 11/2002 | Elliott et al. .................. 707/500 |

OTHER PUBLICATIONS

Microsoft Computer Dictionary, 1997, Microsoft Press, Third Edition, p. 240.*
Business Practices Task Force of NACHA; An Overview of Electronic Bill Presentment and Payment Operating Models, Apr. 9, 1999; Council for Electronic Billing and Payment; pp. 3-9.*
The Microsoft Computer Dictionary, 1997, Microsoft Press, Third Edition, p. 240.*
Microsoft Press: Microsoft Computer Dictionary, 1997, Third Edition, pp. 173-174.
"45 Billion/10-Year CRA Lending and Investment Goal", Retrieved from www.archive.org's link to www.wellsfargo.com web pages from Dec. 2, 1998 and Oct. 1, 1998.

* cited by examiner

*Primary Examiner* — Harish T Dass
*Assistant Examiner* — Siegfried E Chencinski
(74) *Attorney, Agent, or Firm* — Tom Wong; Jim Ross; Micky Minhas

(57) ABSTRACT

A method facilitating secure financial transactions using email is presented comprising the steps of receiving bill data at a server implementing the method, and generating an email message to a recipient with information including at least a portion of the received bill data. The amount of bill data included in the email message is based, at least in part, on the email address of the recipient.

47 Claims, 19 Drawing Sheets

| User_ID | Password | Acct. No. | Acct. No. | P-List | Credit | T_Score |
|---|---|---|---|---|---|---|
| mjsmith@hotmail.com | ********** | 232241753621 | 24257680921 | \<List\> | Y | 9 |
| gbfavre@nolion.com | ***** | 323714452361 | 42458670011 | \<List\> | N | 3 |
| billwaters@norse.com | ******* | 31736451211 | ---------- | \<List\> | N | 0 |
| JohnS@msn.net | ******** | | | | | |

Fig. 5

Fig. 7 eBill from GTE - jillkelly@hotmail.com

Back | Forward | Stop | Refresh | Home | Search | History

Reply | Forward | Print | Save | *Pay* | History | *Management* | ?

From: GTE Food Services Corp. (00213245) Sent: April 27, 1999
To: Ms. Jill Kelly (jillkelly@hotmail.com)
Re: GTE Bill: Amount Due: $155.93                Due: May 27, 1999

Transaction Summary (0099557):
3/27/99    Previous Balance                        $125.00
4/10/99    Payment - *Thank You!*                  $125.00
           Balance Forward                         $0.00

4/12/99    Current Order (*Includes Delivery!*)    $155.93
           - Peco Cola (12 Cases)    ($120.00)
           - FunkyPizza (9)          ($8.00)
           - Poplicious Popcorn (6)  ($27.93)

1802 — Initiator Information

Date: _____

Pay to the
Order of:  Payee Name

One-Hundred and Twenty-Five and No/100 ———— Dollars

1804 — 590900123647586920-0000

*Did you know that you could have received these funds electronically, without having to wait for delivery via the mail system? To participate in the electronic financial revolution, you need to sign up for a free eAccount at http://www.fsc.com. The registration process is quick and easy, and we always have service representatives on hand to answer any questions you might have. To encourage your participation, we will credit your account with $20.00 upon registration. What do you have to lose?*

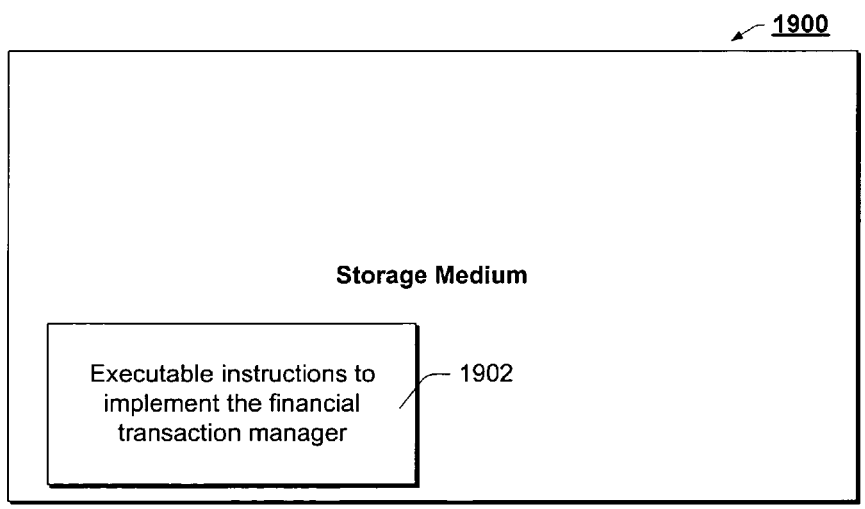

*Fig. 19*

SYSTEM AND METHOD FOR SECURING INFORMATION DISTRIBUTION VIA EMAIL

RELATED APPLICATIONS

This application is a continuation of a copending application Ser. No. 09/751,436, entitled "A System and Method for Secure Distribution of Information via eMail", filed Dec. 29, 2000, now U.S. Pat. No. 7,827,102 by Saliba et al. and commonly assigned to the assignee of this application, which is a continuation of application Ser. No. 09/556,064, entitled "A System and Method for the Secure Distribution of Information via eMail", filed Apr. 21, 2000, by Saliba et al. (now abandoned) and commonly assigned to the assignee of this application.

TECHNICAL FIELD

This invention generally relates to the secure distribution of information electronically and, in one example implementation, the secure distribution of information via electronic mail systems.

BACKGROUND

The concept of buying goods on "credit", or a promise for future payment, is not new. Today, nearly everyone in the industrial world is familiar with receiving bills for goods and services. Every month, like clockwork, millions of consumers receive bills for goods and services. For convenience, the term "consumer" is used throughout this document to represent both a typical person who consumes goods and services as well as a business that consumes goods and services.

At the end of each billing cycle, a biller generates a bill or statement for each consumer account having a positive or negative account balance, or having transactions that yielded a zero balance. As used herein, a "biller" is any party that originates billing statements for goods or services rendered to the consumer. Examples of billers are utilities, government, merchants, and intermediate billing services such as banks. The billing statement is typically customized according to the biller's preferences. For example, it is common for billing statements to be printed on colored paper, display the biller's logo, provide a billing summary, and show itemized transactions. This information is organized in a custom format that is unique to and controlled by the biller.

The biller also creates remittance information that associates the consumer account with the bill and any payment toward the bill. The remittance information is typically in the form of a detachable stub or coupon that the consumer detaches from the billing statement and returns along with the payment. This remittance stub is also customized according to the biller's preferences.

Recently, electronic bill presentment and payment (EBPP) systems have been developed to automate this process of bill delivery and payment. Companies such as Microsoft, Checkfree and Visa, Inc. are developing products in this space, the result of which heretofore has been an associated number of proprietary, closed EBPP systems. One such system is described in U.S. Pat. No. 5,465,206, entitled "Electronic Bill Pay System," which issued Nov. 7, 1995 and is assigned to Visa International.

The Visa bill payment system permits bills to be sent by billers to consumers via U.S. mail or electronically via email. Unfortunately, the Visa system suffers from a number of drawbacks. First, the email message containing the bill must conform to requirements imposed by Visa. This requirement stems from the need to route remittance information back to the biller through the VisaNet® network (one of the four Automated Clearing Houses (ACH) used by financial institutions to clear transactions between accounts). Thus, the biller has little or no control over the format concerning how the bill is presented to the customer, but must instead accommodate a format compatible with this network. Second, the Visa system is designed to support the presentment of "bills" from corporate billers, and would not accommodate the myriad of financial transactions conducted among and between consumers. Third, these prior art EBPP systems (e.g., Visa, Checkfree, etc.) have not be designed for interoperability. Currently, there is no solution available to integrate all of the users from these disparate EBPP systems into a common, ubiquitous network.

These limitations are significant in a number of respects, the most notable of which are the cost and responsiveness of such prior art electronic financial systems. The technical limitations of presenting a bill through the Visa network, for example, effectively requires the biller to have a technical staff that is competent to structure the bills in the required format. The cost of supporting such a staff is prohibitively expensive to all but large corporations.

From a practical standpoint, the technical limitations associated with preparing bills for presentment and payment via the Visa system requires a monthly batch billing cycle. However, many of today's fastest-growing business opportunities that would greatly benefit from such an electronic financial network want to process financial requests instantaneously, or nearly so. The electronic commerce (eCommerce) marketplace presents a fine example. Today, eCommerce relies heavily on the use of the established credit card clearing house system, the cash-on-delivery (COD) service of carrier services, or an escrow service—all of which represent expensive solutions to the technical limitations of the Visa system. Auction houses, for example, typically utilize an escrow service to handle the commercial transaction between two individuals, protecting each of the buyer and the seller from the fraud of the other.

Recently, communication protocols have been introduced, i.e., the Open Financial Exchange (OFX) and, more recently the Internet Financial Exchange (IFX), as a means through which the disparate, proprietary financial networks can communicate with one another. Although these protocols provide a foundation for a solution to the aggregation problem, they are not, in and of themselves a solution. Indeed, a solution to integrate the otherwise disparate networks is not trivial in that a comprehensive system of checks and balances would be required to insure that all of the disparate systems accurately reflect the state of all accounts (billers and consumers alike).

Thus, a ubiquitous network is required which solves the problems commonly associated with the prior art financial networks. One such solution is provided below.

SUMMARY OF THE INVENTION

This invention concerns a system and methods for the secure distribution of information via email. According to an exemplary implementation of the present invention, a method enabling users to conduct financial transactions using email is presented. According to one aspect of the invention, bill data is received at a server implementing the method. In response, the server generates an email message with information including at least a portion of the received bill data, wherein the amount of bill data included in the email message is based, at least in part, on the email address of the recipient. According to one embodiment, the server determines how secure the link to the recipient is from the email address. If the link is deemed secure (e.g., recipient is a participant), the email message will contain substantially all of the bill data. If, alternatively, the link is determined to be less than secure (e.g., the recipient is not a participant), the email message may only contain an address where a more secure communication session may be established to view the bill data. In this way, a server incorporating the teachings of the present invention enables a participant to conduct financial transactions with another, regardless of whether the recipient is a participant, via the email system. By facilitating electronic financial transactions between participants and non-participants, it will be appreciated from the discussion to follow that the present invention solves the aggregation problem typical of prior art electronic financial systems.

According to one implementation, the email server is an Internet mail server adhering to the Post Office Protocol, version 3 (POP3) protocol. Unlike SMTP-based systems, which send email across a number of potentially unsecure servers en-route to the destination address, a POP3 does not send email across a number of unsecured servers, but provides the email directly to the user via an HTML connection upon request. In this regard, the POP3-based system is much more secure than an SMTP-based architecture. According to one aspect of the present invention, the email server includes an innovative financial transaction manager. The financial transaction manager facilitates a plurality of electronic financial transactions between a participant and another (participant or not).

In accordance with this aspect of the present invention, the financial transaction manager includes one or more innovative financial Multipurpose Internet Mail Extension (MIME) types/sub-types or innovative email headers facilitating financial account management and/or transactions via an email client. According to one implementation, the financial transaction manager embeds one or more of the innovative financial MIME elements in the inbox and/or email messages presented to participants. The financial MIME elements enable a user to designate and manage a financial account, pay bills, initiate payment transactions with another, request payment from another, and the like.

BRIEF DESCRIPTION OF THE DRAWINGS

The same reference numbers are used throughout the figures to reference like components and features.

FIG. 5 is a graphical illustration of an example account database maintained by the email system to facilitate financial transactions;

FIG. 7 is a graphical representation of an example user interface provided by the email system to a user, according to one implementation of the present invention;

FIGS. 12A and 12B are graphical illustrations of alternate embodiments of a user interface requesting a payment in accordance with the teachings of the present invention;

FIG. 14 is a graphical representation of an example user interface used to make a payment according to the present invention;

FIG. 17 is a graphical illustration an example user interface to enable one to initiate a payment, according to one aspect of the present invention;

FIG. 18 is a graphical representation of a check issued by the email system in satisfaction of a request to pay;

FIG. 19 is a block diagram of an example storage medium having stored thereon a plurality of executable instructions including at least a subset of which that, when executed, implement the financial transaction manager according to an alternate embodiment of the present invention.

DETAILED DESCRIPTION

This invention concerns a system and method facilitating personal electronic financial transactions with anyone, including non-users of the system and methods, via an email system. In this regard, the present invention overcomes a number of the limitations commonly associated with the prior art including, in particular, the aggregation problem. It will be appreciated, from the description to follow, that the present invention builds upon an innovative electronic bill presentment and payment system first described in presently pending U.S. patent application Ser. No. 09/459,219, filed on Dec. 10, 1999 by Remmington, et al., entitled *Electronic Bill Presentment and Payment System*, which is a continuation of U.S. patent application Ser. No. 08/734,518 (now U.S. Pat. No. 6,070,150), the disclosure of which is hereby expressly incorporated herein, by reference. In describing the present invention, example network architectures and associated methods will be described with reference to the above drawings. It is noted, however, that modification to the architecture and methods described herein may well be made without deviating from the present invention. Indeed, such alternate embodiments are anticipated within the scope and spirit of the present invention.

Example System Architecture

Example Data Network

Figure 1:
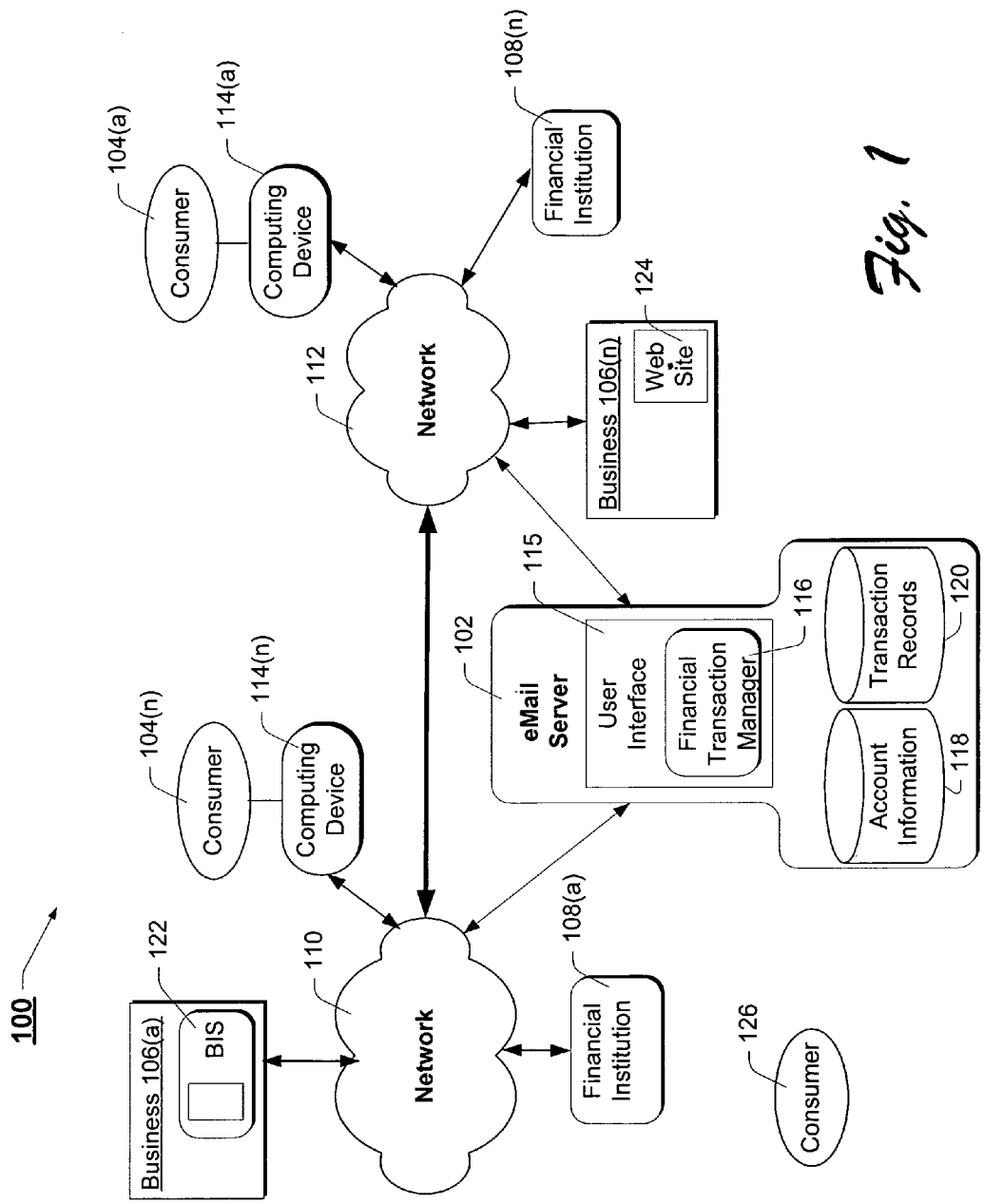
FIG. 1 is a diagrammatic illustration of a data network incorporating the teachings of the present invention.

FIG. 1 illustrates an example network 100 including an email system 102 with an innovative financial transaction manager 116, which enables any user of the email system to conduct financial transactions with other users and non-users alike. Network 100 is comprised of a number of network participants (i.e., users registered with the email system) including consumers 104(a) . . . (n), businesses 106(a) . . . (n), and financial institutions 108(a) . . . (n) each communicatively coupled to the email system 102 via one or more networks 110 and 112. As shown, networks 110 and 112 are intended to represent a wide variety of networks and a wide variety of communication technologies. In this regard, networks 110 and 112 may well comprise, for example, public networks (Internet), private networks (enterprise wide area networks (WAN), data networks and communication networks (public switched telephony network (PSTN), cellular telephony network, and the like). In this regard, financial network 100 is intended represent a composite of any number of networks through which participants can access and benefit from the innovative services provided by email system 102. Due to the confidential nature of the information and transactions, however, security measures are taken when communicating over public networks. According to one embodiment, for example, when the user is communicating with the email server 102 via the Internet, email server 102 employs the well known secure HyperText Transfer Protocol (HTTPS).

It will be appreciated that each of the network participants accesses and utilizes the resources of network 100 through a computing platform. Accordingly, consumers 104(a) . . . (n) are depicted communicative coupled to network 100 via computing devices 114(a) . . . (n), respectively. Similarly, businesses 106(a) . . . (n) and financial institutions 108(a) . . . (n) also access the resources of network 100 through one or more computing devices. For ease of illustration and explanation, the computing interface for businesses 106 and financial institutions 108 have been omitted from FIG. 1 so as to not obscure the innovative aspects of the present invention. For purposes of this discussion, use of the term "consumer", "business", "financial institution", "user" or "network user" are each intended to represent the respective entity as well as a suitable computing interface.

As used herein the computing devices used by network users are intended to represent a broad range of computing devices known in the art. As will be shown with reference to FIG. 4, a computing device, e.g., 114, does not require any special features or capability other than an email client application executing on the computing device to access and interact with the email system 102. Accordingly, computing devices 114(a) . . . (n) are intended to include, but are not limited to, personal computers, electronic kiosks, personal digital assistants (PDAs), wireless telephones, wireline telephones, thin-client terminals, and the like through which a user may interact with email system 102.

Email system 102 is shown comprising a user interface 115 with an innovative financial transaction manager (FTM) 116, a storage device 118 including email system account information, and a storage device 120 to store and maintain transaction records. Although shown separately, the email system account information and the transaction records may well be stored and maintained in a single storage device, e.g., 118, and may be integrated into a common database. According to one implementation, to be described more fully below, email system 102 is implemented using one or more computer systems, or data servers, which work in cooperation to provide the innovative services described herein. It will be appreciated, from the discussion to follow, that the innovative aspects of the email system 102 may well be embodied in hardware, e.g., analog or digital circuitry, or in software executed by one or more processor(s) of the computer system(s).

But for the inclusion of innovative financial transaction manager 116, the email server application/user interface 115 is intended to represent any of a broad category of email server applications commonly known in the art. In this regard, email server application 115 implements a number of common email services such as, for example, compose email, send email, receive email, display email, and the like. According to one implementation, to be described more fully below, the email server application 115 adheres to the Post Office Protocol, version 3 (POP3) for internet based email systems. Thus, unlike the simple mail transfer protocol (SMTP) which only sends US ASCII text, email messages adhering to the POP3 protocol may include any of a number Multipurpose Internet Mail Extension (MIME) elements. MIME elements may include US ASCII text, hypertext markup language (HTML) instructions, non-US ASCII text which are interpreted to display a graphical image, and the like. Indeed, as will be described more fully below, the innovative financial transaction manager 116 includes one or more financial MIME sub-types which, when sent to a user of the system, enable the user to manage and manipulate assets in one or more financial accounts. That is, the financial MIME elements provided by financial transaction manager 116 enable a user to securely conduct financial transactions using innovative email system 102. In one implementation, the email server application 115 is the Hotmail™ internet mail service.

The financial transaction manager (FTM) 116 provides the functional control of the financial transaction services offered through email system 102. As will be described in more detail below, FTM 116 facilitates secure financial transactions using an email user interface provided by email system 102. In particular, as will be developed more fully below, financial transaction manager (FTM) 116 enables a user to initiate payments, request payments, authorize payments and perform a number of account maintenance and management functions through an email user interface. In this regard, the FTM 116 interfaces with one or more asset-backed accounts at financial institutions to facilitate the electronic financial transactions. Unlike prior art systems, however, the financial transaction services of financial transaction manager 116 are not limited to corporate billers. Indeed, it will be appreciated that financial transaction manager 116 does not distinguish between "billers" and "consumers" in the EBPP sense of these terms. Rather, financial transaction manager 116 only distinguishes between "users" and "non-users" of the email system 102, as this distinction will control whether the transaction may be carried out entirely electronically, or whether physical bills, checks, and the like will be required to complete the transaction. Thus, any user may, at a first time be a "biller" (i.e., request payment into an email system account), while at a second time be a "consumer" (i.e., purchase goods/services utilizing an email system account).

Moreover, unlike the EBPP systems of the prior art, the financial transaction manager 116 enables a user to initiate financial transactions with non-users 126 of the system, according to one aspect of the present invention. Indeed, according to certain business models to be described more fully below, financial transactions with non-users 126 may be tailored by the financial transaction manager 116 to include a special offer/invitation to establish an account on the email system 102 and "join" the service. In this regard, the financial transaction manager 116 enables the email system 102 to better accommodate the myriad of financial transactions performed daily by consumers, small business and large corporations alike—i.e., the financial transaction manager 116 facilitates the implementation of a truly ubiquitous financial network 100.

In addition to the financial transaction manager 116, email system 102 includes a storage medium of email accounts 118 and financial transactions 120. These storage media 118 and 120 are responsive to instructions received from financial transaction manager 116. Although depicted in FIG. 1 as being a functional unit of email system 102, it will be appreciated that storage media 118 and 120 may well be remotely located.

The email account information may contain a plethora of personal information but, at a minimum, includes a unique user identifier (user_ID) and information regarding an asset-backed financial account at a financial institution (e.g., financial institution 108(a) ... (n)). The transaction records 120 are used by financial transaction manager 116 to maintain a history of financial transactions, the amount of the transaction, and the status of the transaction. As used herein, storage media 118 and 120 are each intended to represent a wide variety of storage media known in the art and, thus, need not be further described here.

As shown, businesses 106(a) ... (n) may access (and be accessed from) the network 100 in any of a number of alternate means. According to one implementation, business 106 (a) may utilize a legacy biller integration system (BIS) 122 to send batch billing statements to email system 102 for presentment to and payment by consumers 104(a) ... (n). Examples of innovative EBPP systems incorporating BIS technology are provided in U.S. patent application Ser. No. 08/734,518 to Remington, et al. described above; U.S. patent application Ser. No. 08/936,235 to Campbell, et al., entitled System and Method for Designing Responses for Electronic Billing Statements; U.S. Pat. No. 6,128,603 to Dent, et al., entitled Consumer-Based System and Method for Managing and Paying Electronic Billing Statements; U.S. patent Ser. No. 08/880,125 to Campbell, et al., entitled System and Method for Designing and Distributing Customized Electronic Billing Statements; U.S. patent application Ser. No. 09/093,959 to Heindel, et al., entitled Distributed Electronic Billing System with Gateway Interfacing Biller and Service Center; and U.S. patent application Ser. No. 09/093,958 to Keith, et al., entitled Parcel Manager for Distributed Electronic Billing System the disclosures of all of which are hereby expressly incorporated herein by reference.

In alternate embodiments, however, businesses 106 may utilize the innovative features of financial transaction manager 116 to request payment from consumers. That is, a business may utilize the same email user interface 115 that consumers use to initiate financial transactions. In this regard, financial transaction manager 116 facilitates use of the electronic financial network 100 by small businesses, sole proprietorships, and the like without having to invest in a technical support staff to structure bills. If an employee/owner can use a web-site they can initiate a request for payment using the email system 102. According to one implementation, financial transaction manager 116 provides users with monthly transaction summaries for their accounts. Businesses may, using the customer service features of financial transaction manager, receive more detailed summaries, and can tailor the summaries for their use (i.e., to accommodate financial management/accounting software).

Any financial transactions performed using the services of email system 102 must ultimately be cleared through asset-backed accounts of financial institutions 108(a) ... (n) associated with the transaction participants. These financial institutions are intended to represent any of a wide variety of financial institutions including, but not limited to, banks, credit unions, brokerage houses, etc. According to one embodiment, email system 102 is provided by a financial institution, and the accounts 118 are asset backed accounts such that transactions clear nearly instantaneously. In alternate embodiments, the accounts 118 merely represent one or more asset-backed accounts at a financial institution(s). In this alternate embodiment, transactions are cleared through the well known automated clearing house (ACH) network.

The ACH network is a nationwide system that processes electronic payments on behalf of depository financial institutions. The ACH network represents approximately 15,000 of the 20,000 financial institutions in the United States. Although best thought of as a single network, the ACH network actually consists of four interconnected networks owned and operated by four ACH operators: the Federal Reserve, VISA, New York ACH (which provides regional coverage in New York), and Arizona Clearing House in conjunction with Deluxe Data (which provides regional coverage in Arizona). The ACH network is well-known in the art. Thus, in this embodiment, the FSC account 118 may be thought of as a proxy, or front end, for the asset backed financial account.

Figure 2:
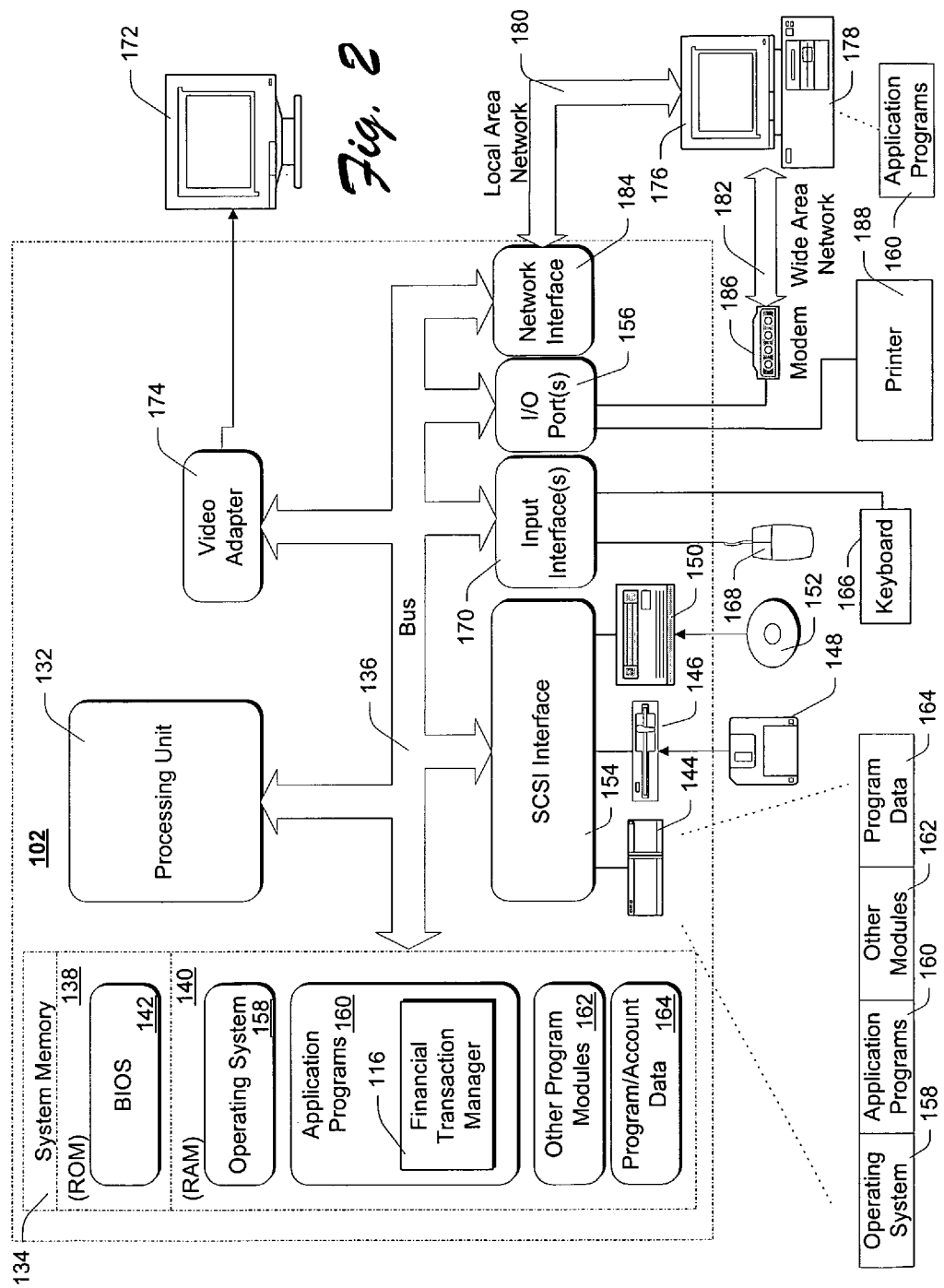
FIG. 2 is a block diagram of a computer system suitable for use as the email system of FIG. 1, according to one embodiment of the invention.

FIG. 2 illustrates an example computer system suitable for use as the email system 102 of FIG. 1. As described above, but for the innovative financial transaction manager 116, email system 102 is intended to represent any of a class of general or special purpose computing platforms which, when endowed with the innovative financial transaction manager 116, implement the teachings of the present invention in accordance with the first example implementation introduced above. It is to be appreciated that although the financial transaction manager 116 is depicted in FIG. 2 as a software program, computer system 102 may alternatively support hardware implementations as well. In this regard, but for the description of financial transaction manager 116, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102.

Although the exemplary environment described herein employs a hard drive 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard drive 144, magnetic disk 148, optical disk 152, ROM 138, or RAM 140, including an operating system 158, one or more application programs 160 including, for example, the innovative financial transaction manager 116 incorporating the teachings of the present invention, other program modules 162 including an email server application 115 (e.g., the Hotmail™ email server application), and program data 164 (e.g., email system accounts and/or transaction records). A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 2.

As shown, the logical connections depicted in FIG. 2 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Wash. to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via a input/output (I/O) interface 156. In addition to network connectivity, I/O interface 156 also supports one or more printers 188. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Financial Transaction Manager

Figure 3:
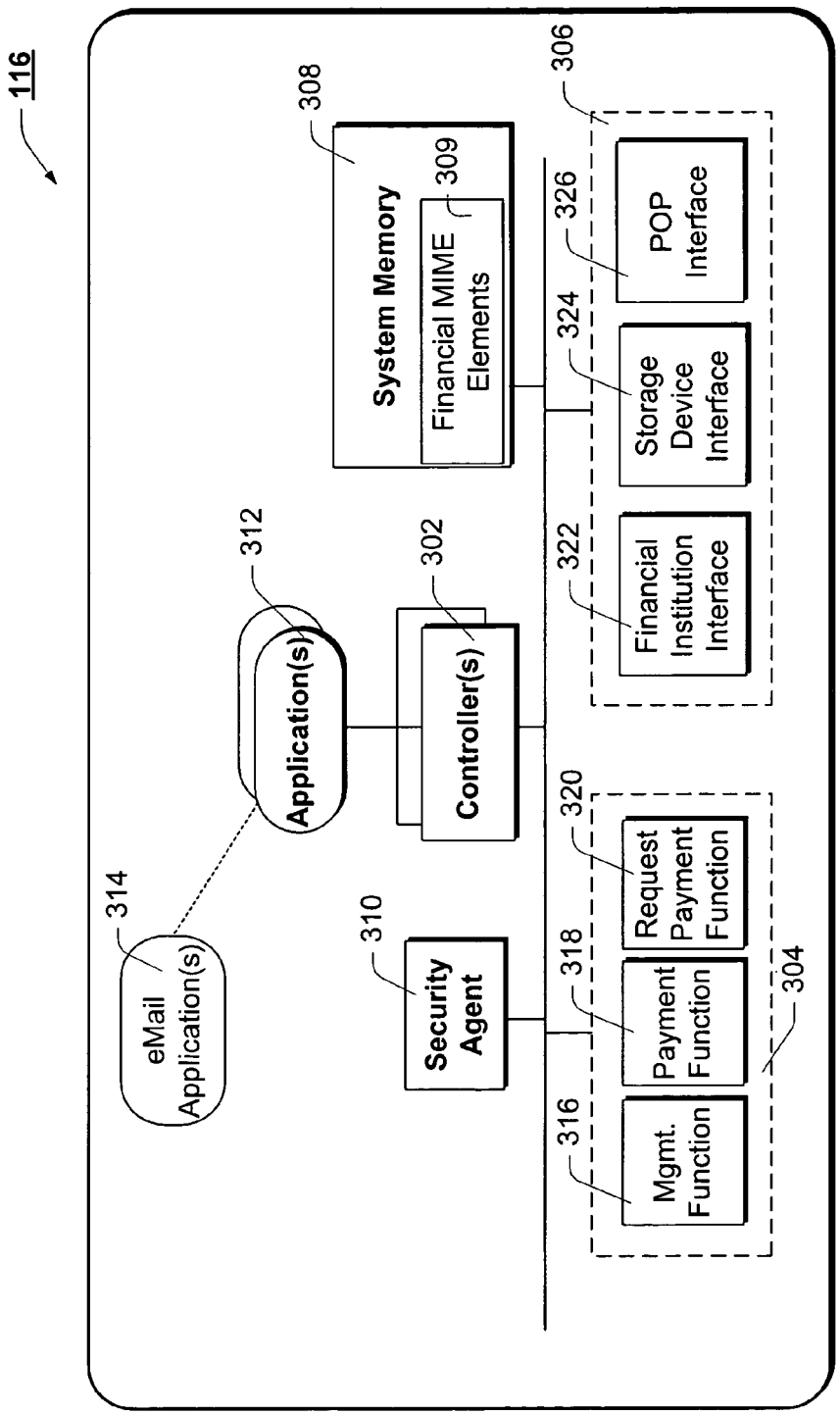
FIG. 3 is a block diagram of an example financial transaction manager, according to one embodiment of the present invention.

FIG. 3 illustrates a block diagram of an example financial transaction manager 116, incorporating the teachings of the present invention. As shown, financial transaction manager 116 is comprised of one or more controller(s) 302, financial manager function(s) 304, network interface(s) 306, storage device/memory 308 including transaction records 309, a security agent 310 and, optionally, one or more applications 312 including, for example, an email interface 314, communicatively coupled as shown. For ease of explanation and illustration, financial transaction manager (FTM) 116 is shown in FIG. 3 as a plurality of functional blocks. It is to be appreciated, however, that one or more of the individual blocks may well be combined into a single block. Moreover, FTM 116 may well be implemented as a plurality of executable functions in software which, when executed, implement the financial services of FTM 116 to be described more fully below.

Controller(s) 302 are intended to represent a wide variety of control and processing devices known in the art. Controller 302 manages the invocation of financial transaction services of the email system 102. In this regard, controller 302 is responsive to user input received via the email application/user interface 115 to selectively invoke services of the financial manager suite 304. This communication is performed through appropriate ones of the network interface(s) 306 to be described more fully below. Moreover, in an alternate embodiment, controller 302 selectively invokes its own email user interface 314, obviating the need for a user interface at the email system level.

Controller 302 selectively invokes services of the financial manager suite 304 in response to user interaction with the email user interface 115 of email system 102. As shown, the financial manager functions 304 include a management function 316, a payment function 318, and a request payment ("bill" generation) function 320. The management function 316 enables individual users to register for the services of the email system 102, create an email account on email system 102 (stored in storage medium 118), establish and modify a participant list (p_list) of others with whom the user conducts financial transactions, establish an encryption key and the like. The p_list is maintained in the email system account and provided to the user when subsequent financial transactions are performed.

The payment function 318 is invoked by controller 302 when a user indicates that they wish to initiate a payment to another. As will be described more fully below, the initiate payment function 318 may be invoked in response to receiving a bill, or may be initiated by the user from the main user interface (i.e., the email system Inbox).

Unlike prior art EBPP systems, the financial transaction manager 116 enables this payment to be made to one who is not a user of the email system 102. If the "payee" is a user of the email system 102, the user initiating the transaction ("payer") identifies the recipient ("payee") from their p_list, or alternatively, from a master list of users (e.g., provided by the FTM 116). The user provides information regarding the amount to be paid and any additional information describing the transaction (for the benefit of the payee), and issues the transaction. According to one implementation, controller 302 logs the transaction and issues the email to the payees email account. According to one implementation, controller 302 embeds an HTML frameset tag in the email that, when received and read by the payee, will redirect the payee's view window to a web page containing the financial transaction information utilizing a Secure Socket Layer (SSL) encrypted communication channel. In either case, once the payer has issued the transaction, it is posted in the payee (recipients) email account. If the "payee" is not a user of the email system 102, alternate means of notification and payment are utilized, and will be described in greater detail below.

The request payment function 320 is a means by which a user can "bill" another. As above, the request payment function 320 may well be invoked by a user to solicit a payment from one who is not a user of the email system 102 using an appropriate one of a plurality of alternate request means. If, however, the recipient of the request (payer) is a user of email system 102, the requestor (payee) provides information requested by a user interface associated with the function and issues the request. Once authorized, the requested funds will be posted in a bank account associated with the payee (as identified by an email account). Notice of the deposit of such funds are sent to the requestor (payee) email account.

The security agent 310 is employed to ensure that the one requesting the funds is actually associated with the account to which the funds are to be deposited. In this regard, security agent 310 performs an important function of ensuring that the integrity of the email system 102. Security agent 310 is responsible for ensuring the security of communications between email system 102 and any user using any of a myriad of available encryption schemes. According to one implementation, introduced above, security agent 310 includes a personal encryption key obtained for the user based, for example, on the personal identifier (e.g., MSN Passport), and the like. According to one implementation, security agent 310 stores a copy of the encryption key on a client's computer in the form of a cookie, or other suitable format to enable the client to issue secure email messages using system 100.

In addition, security agent 310 is also responsible for "policing" the authenticity of users and the use of the email system. According to one implementation, security agent 310 is responsible for generating authentication codes which are provided to users/potential users by FTM 116, the way in which passwords are hashed for storage/retention, the way in which a secret token is hashed into a cookie (further facilitating subsequent automated access), use of public key/private key encryption, and/or the rules used for password lengths and complexity.

As introduced above, financial transaction manager 116 includes a number of interfaces 306 enabling FTM 116 to interface with a variety of peripherals and networks. Thus, according to one implementation, FTM 116 includes a financial institution interface 322, a storage device interface 324 and a network interface 326. As used herein, the financial institution interface 322 enables the FTM 116 to communicate with financial institutions in a format suitable for clearing transactions via the ACH. The storage device interface 324 enables controller 302 to communicate with external storage devices in a language employed by data structure in which the account information and the transaction records are maintained (e.g., SQL database interface, etc.). The network interface 326 is the means by which controller 302 interfaces with the user interface 120 and email system users. Thus, according to one embodiment, network interface 326 is a POP interface with standard MIME definitions.

Storage device/system memory 308 is intended to represent any of a broad category of storage devices/media known in the art. As shown, storage device/system memory 308 includes definitions for the innovative financial MIME elements 309. As alluded to above, the financial MIME elements 309 enable a user to conduct financial transactions using the email client executing on their computing device 114. The financial MIME elements 309 are provided to the user via email system 102 as HTML content, projecting "buttons" which, when selected, implement certain management or transaction-related services. In alternate embodiments, they are redirected from a financial email message to a secure web page wherein the financial transactions may be completed.

Figure 4:
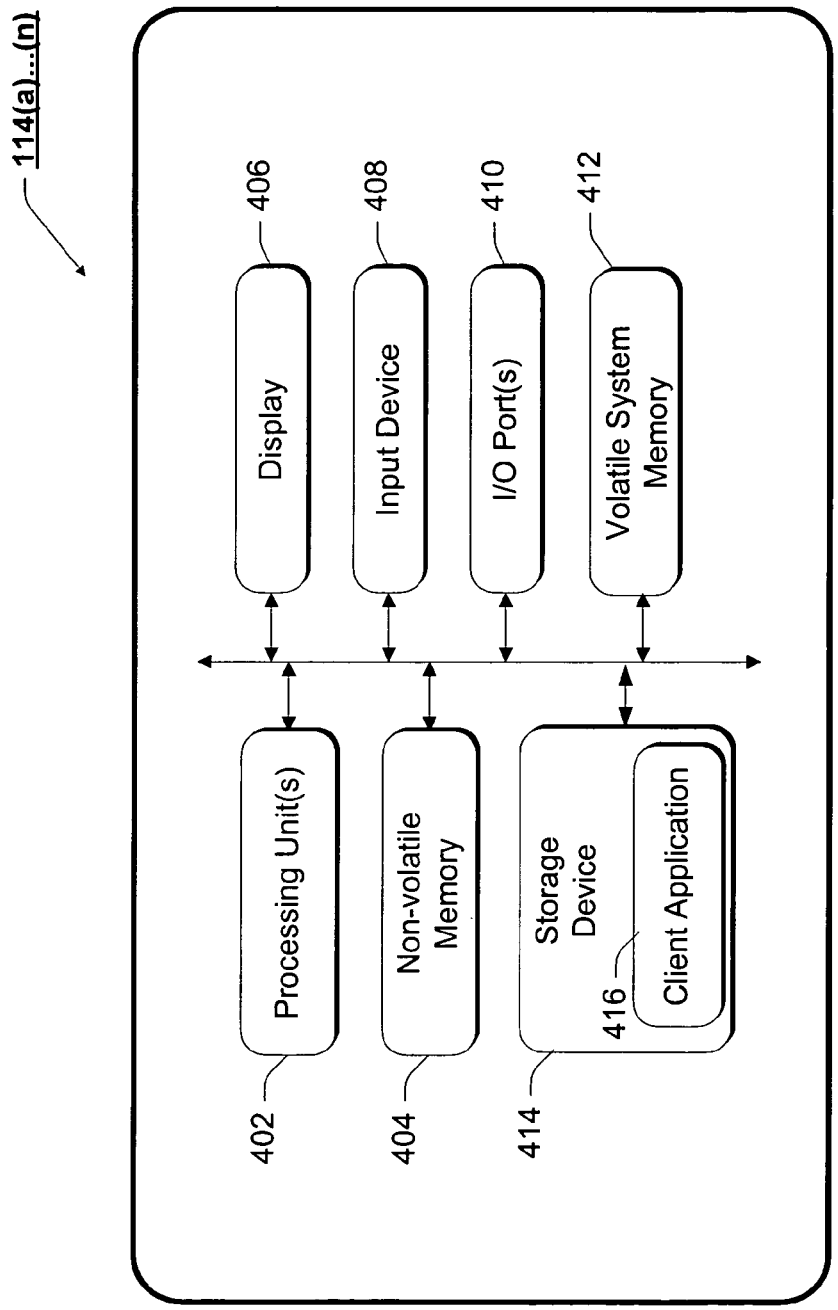
FIG. 4 is a block diagram of an example computing device suitable for use to access and utilize the email system of the data network.

FIG. 4 is a block diagram of an example computing device 114 suitable for use within network 100 to enable users to access and utilize the features of email system 102, according to one embodiment of the present invention. As shown, computing device 114 includes one or more processing unit(s) 402, a non-volatile memory device 404, a display device 406, an input device 408, input/output (I/O) port(s) 410, volatile system memory 412 and a storage device 414 including an email client application 416 which, when executed, enables the computing device 114 to interface with the email system 102 over a network 100.

As described above, except for the interaction with email system 102, computing device 114 is intended to represent a wide variety of computing devices known in the art, and does not require any special features in order to access and utilize the innovative services of email system 102. Similarly, the functional blocks 402-426 are each intended to represent any of a plurality of devices which perform these functions and, thus, need not be described further.

Example Data Structures

As introduced above, the email system account information is stored and accessible from a suitable data source, e.g., data source 118 and 120, respectively, by financial transaction manager 116. As used herein, data sources 118 and 120 are each intended to represent any of a number of storage devices/media for storing data structures. For example, data source 118/120 may well be comprised of one or more of a floppy disk within a floppy disk drive, a hard disk drive, a redundant array of independent drives (RAID) system, a compact disk (CD) inserted within an accessible CD player, a digital versatile disk (DVD) inserted within an accessible DVD player, a magnetic tape within a tape drive, and the like. In addition, although depicted as an integrated element of email system 102, those skilled in the art will appreciate that use of a remotely accessible storage device may also be utilized in accordance with the spirit and scope of the present invention. Such storage devices/media are well known to those skilled in the art and, thus, need not be described further.

FIG. 5 graphically illustrates an example data structure 500 suitable for use as an email system account database (or file) populated with information regarding a plurality of users of email system 102. Email system account file 500 is used by email system 102 to maintain a list of registered users and their associated financial account information to support the financial services provided by financial transaction manager 116. As shown, email system account file 500 includes a number of fields including one or more of a user_ID field 502, password information 504, one or more financial institution account numbers 506(a) ... (n), the user's participant list 508, an indication of whether to extend credit 510, and a growing trust model score 512. It will be appreciated that email system account files 500 of greater or lesser complexity may well be used without deviating from the spirit of the present invention. Indeed, such email system account files are anticipated within the teachings of the present invention.

As used herein, the user_ID field 502 and the password information field 504 enable financial transaction manager 116 to verify the identity of a user requesting access to an account. In this regard, the user_ID/password combination must be unique to a single individual. A number of user_ID and password criteria may be used to satisfy the uniqueness criteria. In one implementation, for example, a user's Microsoft Passport ID (email address/password combination) are used to uniquely identify the individual. In addition, the email system account file 500 may well contain additional user information such as, for example, an address, a telephone number, and/or additional credit history information (not shown).

The financial institution account numbers 506(a) ... (n) provide a link to the asset-backed accounts of a bank, brokerage, etc., that store the financial assets to cover the financial transactions of the user. In this regard, the financial institution (FI) accounts are intended to represent any of a wide variety of such accounts known in the art including, but not limited to, savings accounts, checking accounts, money market accounts, brokerage accounts and the like. In one embodiment, the email system 102 provides its users with an FI account (i.e., an integrated email/FI account), enabling users to deposit and withdraw funds from the email account itself.

The P_list field 508 is populated with a list of individuals with whom the user conducts regular financial transactions using the email system 102. It should be noted that the P_list field 508 may well contain user's and non-user's of email system 102. That is, a user is not limited to conducting financial transactions with another user of the email system 102. In one implementation, financial transaction manager 116 automatically adds/subtracts participants from P_list 508 based, at least in part, on the number of transactions with the participant over a certain period of time. In such an implementation, the individual user can always add/subtract participants to/from the P_list 508 (referred to as "scrubbing" the P_list).

The credit field 510 provides an indication of whether FTM 116 may extend credit to an identified user. In one implementation, this determination is simply made based on whether a credit account has been identified as an account number 506(a) ... (n). In an alternate implementation, email system 102 may also extend credit to a user based, at least in part, on a user's score in a growing trust model, reflected in T_score field 512. In this implementation, to be described more fully below, financial transaction manager maintains a T_score for each user based, at least in part, on the number of transactions performed, the number of transactions involving insufficient funds, the amount of money involved in the transactions, etc. If the T_score exceeds a threshold, FTM 116 may extend credit to the user backed by email system 102 itself.

Figure 6:
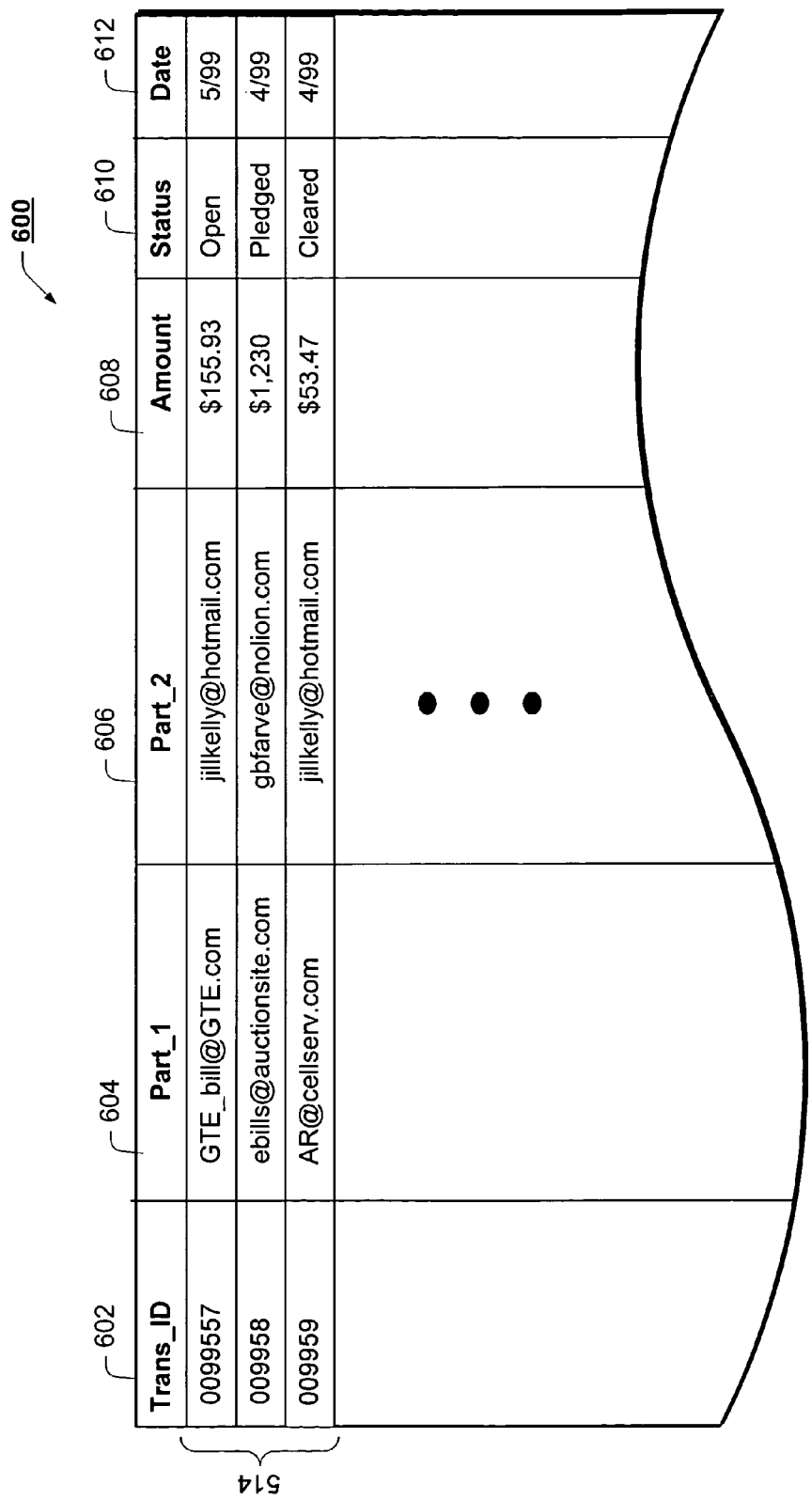
FIG. 6 is a graphical illustration of an example transaction list maintained by the email system to facilitate financial transactions.

FIG. 6 graphically represents an example data structure 600 suitable for use as a transaction record database (or file) to store and maintain the financial transactions of email system 102. As shown, data structure 600 includes a transaction identifier field 602, a plurality of transaction participant fields 604, 606, a transaction amount field 608, a transaction status field 610 and a date field 612. The transaction ID field 602 is assigned by the FTM 116 to uniquely identify a particular transaction. According to one embodiment, the same identifier is used to uniquely identify an email message within email system 102. In alternate embodiments, a separate email message identifier is created by email system 102 and stored in a field (not shown) of data structure 600 corresponding to an appropriate transaction_ID.

The participant fields 604 and 606 denote the names and contact information for the participants to a particular transaction. Only two participant fields 604 and 606 have been shown for purposes of explanation and illustration. It is to be appreciated that two or more fields may well be presented. The amount field 608 provides the current amount involved in the transaction. The value denoted in the amount field 608 is updated in response to payments and partial payments. The status field 610 denotes the current status of the transaction. According to one implementation, the transaction may be open (i.e., not yet completed), pledged (i.e., funds have been allocated, but have not yet cleared the associated financial institutions), rescinded (i.e., when the sender decides to repeal a payment that has not yet cleared, or closed. (i.e., complete and cleared). It is to be appreciated that more or less status indicators may well be used without deviating from the spirit and scope of the invention.

Example User Interface

Figure 7:
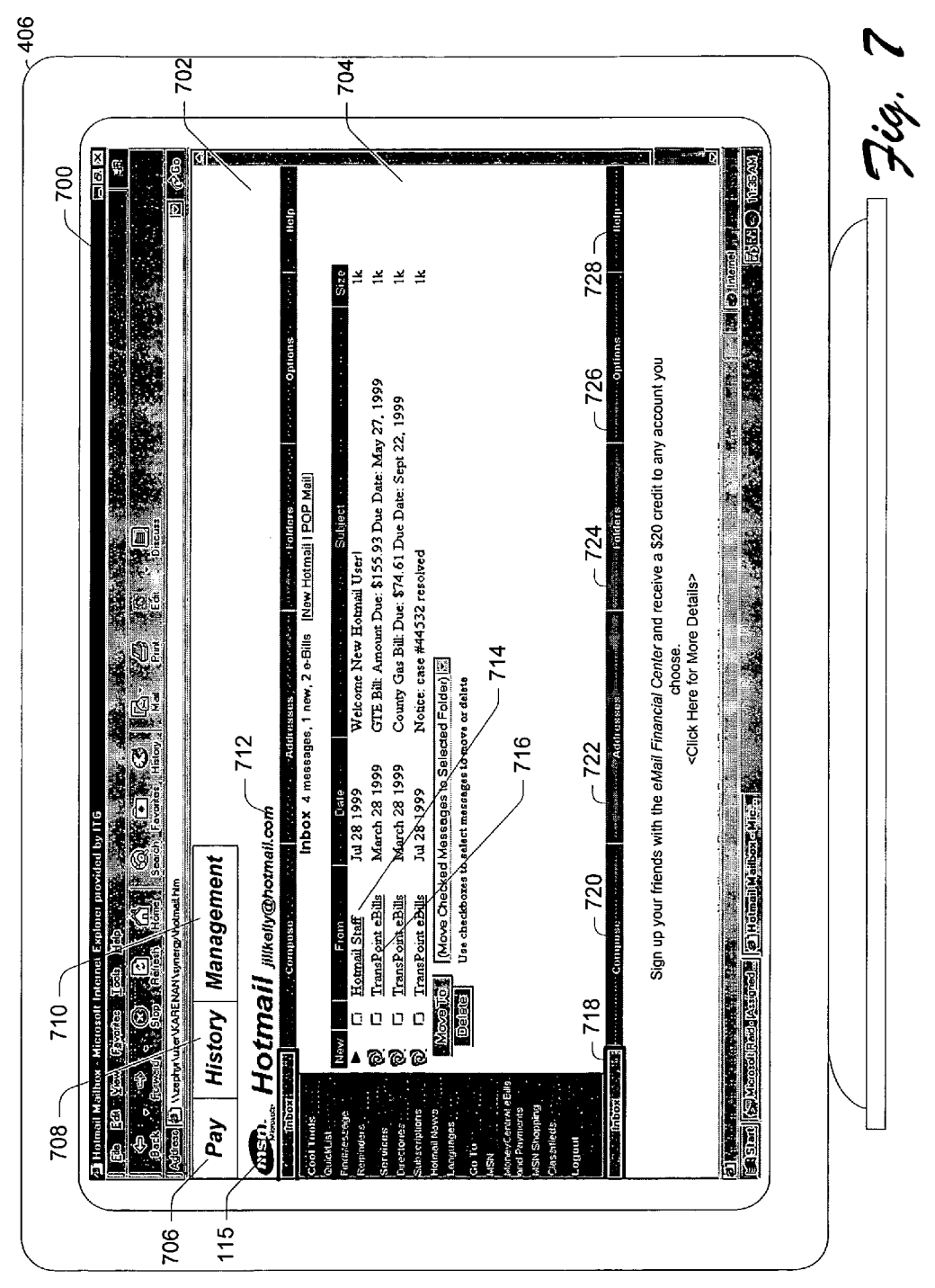

FIG. 7 shows an example illustration of a graphical user interface 115 for an email system 102 rendered on a computing device display 406 by an email client application 416 executing on such a computing device 114. In this example, the user interface is presented by a Hotmail™ email server application 115. As shown, the billing statement 700 is written in a "markup language," such as HyperText Markup Language (HTML), eXtensible Markup Language (XML) and the like and, in the illustrated example embodiment, incorporates innovative financial functions 706, 708 and 710. HTML and XML are subsets of SGML (Standard Generalized Markup Language), a language formally defined as "a language for document representation that formalizes markup and frees it of system and processing dependencies." HTML documents are compatible with the World Wide Web. The email system user interface 700 is rendered within an internet browser application, such as the Internet Explorer browser from Microsoft Corporation, which executes on the consumer's computer 114.

In one embodiment, the email system user interface 700 is rendered according to the template design having a header 702 and a body 704. The header includes the financial function buttons 706-710 enabling a user to pay a bill (706), retrieve account history information (708) or perform account management (710) In addition, the header 702 optionally contains the user's email address 712. The body 704 contains email messages (e.g., 714) and financial transaction messages (e.g., 716). The top and the bottom of the body area 704 is defined by row of functions 718-728 which enable a user to compose email messages and/or requests for payment 720, update email addresses, store user-defined folders 724, email options 726 and email related help 728. Although the financial function buttons 706-710 are illustrated in the header 702, those skilled in the art will appreciate that the buttons may well be placed in alternate locations, or duplicated in a number of locations within the user interface 700. Further it is to be appreciated that the graphical user interface 700 is but an example embodiment, and other user interfaces (e.g., audio, etc.) for retrieving email messages may well be used in place of, or addition to, the GUI shown in FIG. 7.

As alluded to above, the email interface 700 has multiple softkeys or buttons 706-710, 718-728 that form tabbed navigation points to facilitate quick movement from one section of the interface to another. As will be described in detail below, selection of one of the virtual function keys invokes a corresponding function or feature of FTM 116 and/or email server application 115. In this example, the main "menu" or "window" (shown) displays the Inbox of the email account. The Inbox enumerates all of the messages (email messages and bills) for the account, as well as its current status. According to an exemplary embodiment of the present invention, as the status for a particular financial transaction changes, the change is displayed in the Inbox. According to one embodiment, the change is reflected in the single line item associated with the message, i.e., there will only be one line item enumerated for each individual transaction. Activation of any of the financial function keys causes FTM 116 to provide the user with a user interface corresponding to the particular function selected. As will be described below, selecting an enumerated transaction from the inbox, for example, causes the bill detail for that transaction to be displayed. Each of the functions, and their corresponding UI's will be described in greater detail below.

Example Operation and Implementation

Having introduced the operating environment and functional elements of the innovative email system 102 with reference to FIGS. 1-7, above, the operation of the system will now be developed more fully below with reference to FIGS. 8-17.

Management Function and User Interface

Figure 8:
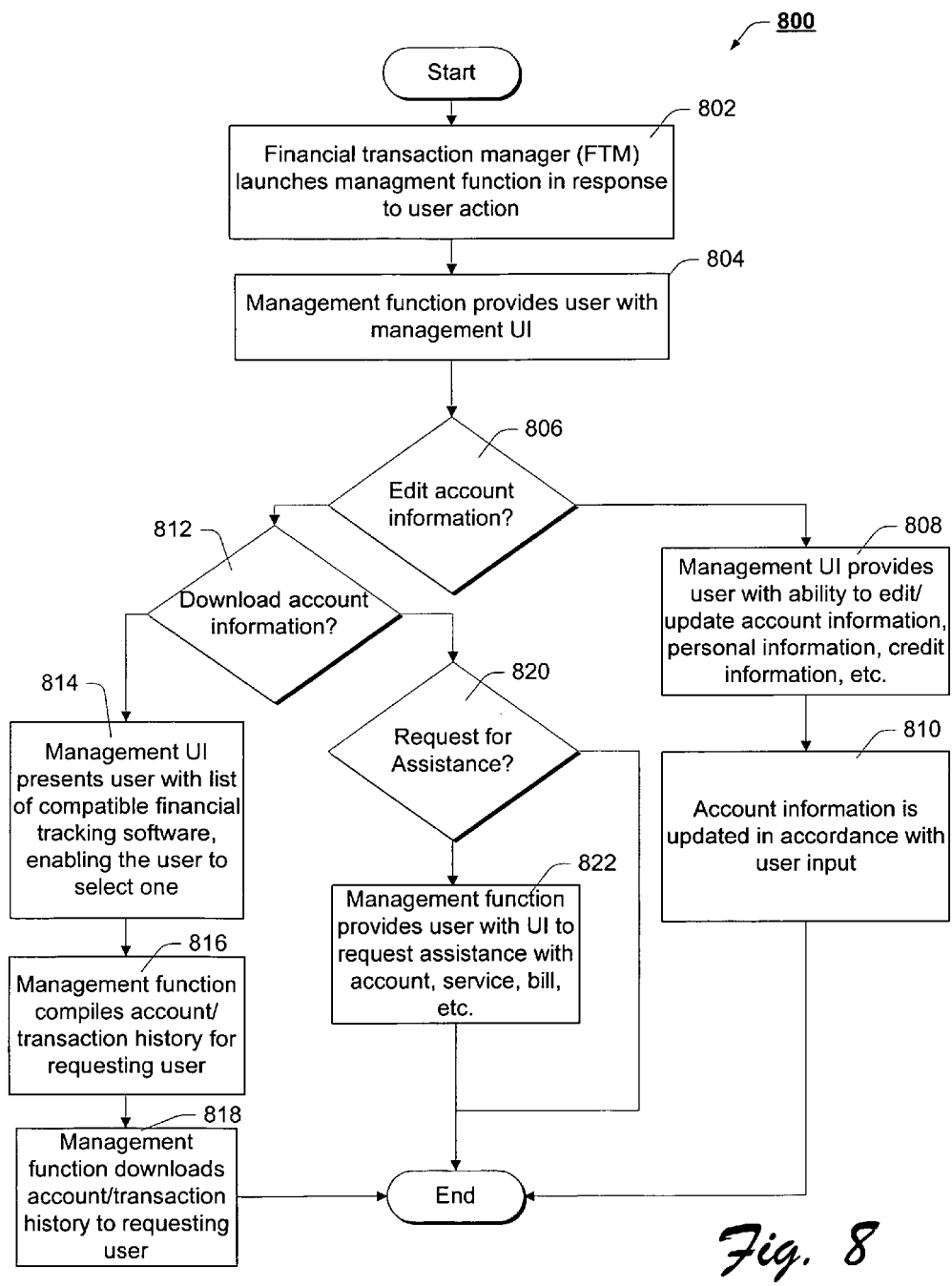
FIG. 8 is a flow chart of an example method for managing financial account information in accordance with the present invention.

FIG. 8 illustrates a flow chart of an example method for establishing and managing an email system account, according to one implementation of the present invention. As shown, the method begins with step 802 wherein the FTM 116 invokes an instance of management function 316 in response to a user selecting the management button 710 of the email system user interface 700. In step 804, the management function 316 presents the user with a management user interface through which the user can establish and manage email system account(s), download account information to their computing device, and request technical support of the email system 102. An example graphical user interface for the management function is presented with reference to FIG. 9.

Figure 9:
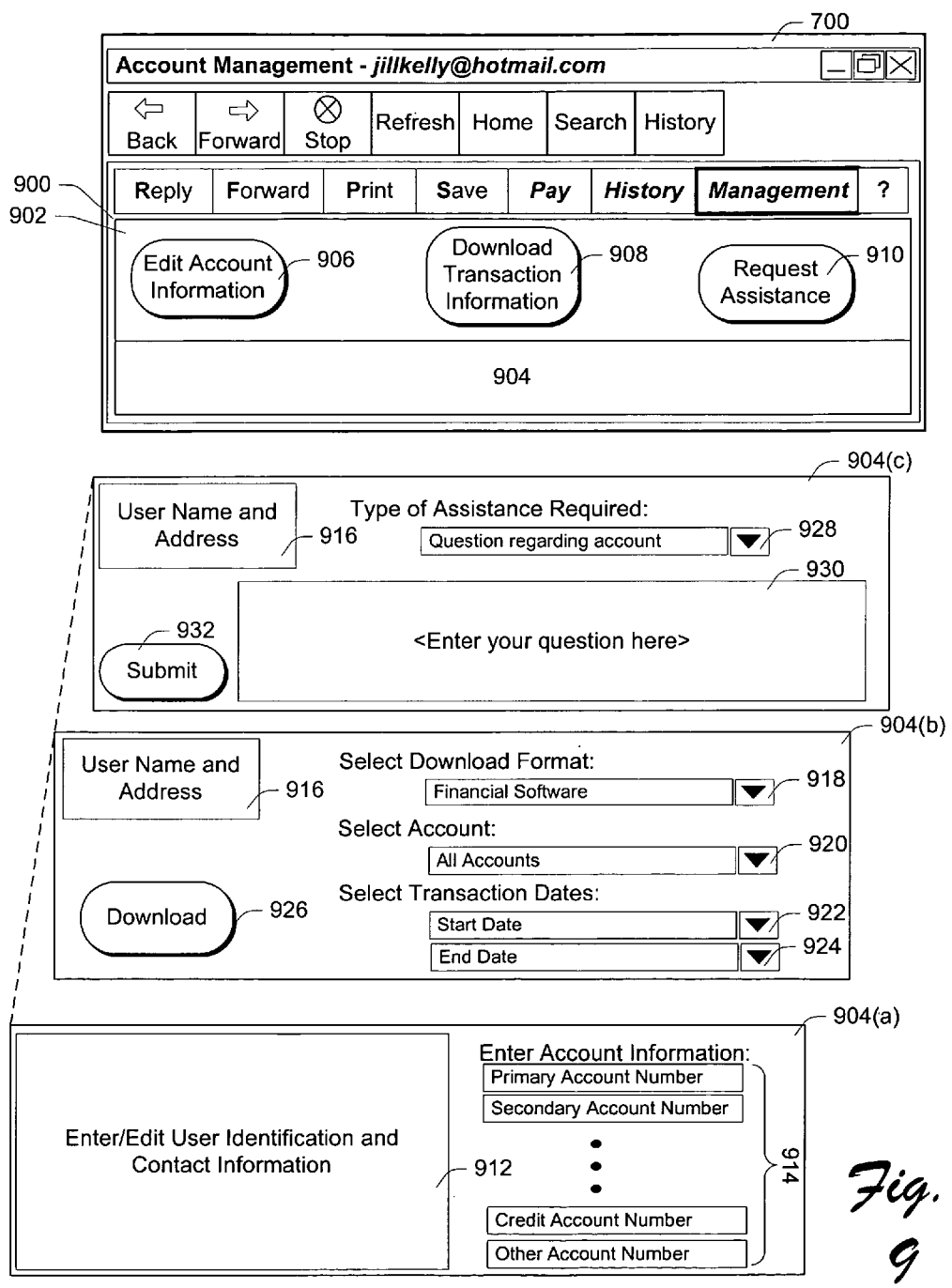
FIG. 9 is a graphical illustration of an example user interface to enable a user to manage financial account information, according to one implementation of the present invention.

Turning briefly to FIG. 9, a graphical user interface (GUI) 900 suitable for use as the management UI is presented comprising a functional header area 902 and a body section 904 that is modified to reflect the management function selected. In the header area 902, one or more soft-keys (buttons) are presented corresponding to any of a number of management functions/services. According to the illustrated example embodiment, management function 316 provides buttons to edit account information 906, download transaction information 908 and request technical assistance 910. Depending on the button selected, the body 904 of the management UI 900 is modified to reflect the selection.

If, in FIG. 8, a user elects to edit account information in step 806, management function 316 provides the user with the ability to edit/update account information, personal information, credit information, etc. in step 808. More specifically, FTM 116 displays window 904(*a*) of FIG. 9, providing a number of fields enabling the user to enter/update their name, address, telephone numbers, user_ID, password, and the like (cumulatively depicted as area 912. In addition, a number of fields 914 are presented wherein the user can enter/update account information for a primary financial institution (FI) account, a secondary FI account, a credit account, etc.

If the user elects to download account information, step 812, the management function 316 provides the user with a window 904(*b*), displaying the user's name and address 916, enabling the user to select the download format 918, an account 920, a transaction start date 922 and end date 924, step 814. Once the user has made their selection and pressed the download soft-key 926, the management function 316 compiles the requested account transaction history into the selected format for download to the user, step 816. In step 818, the compiled information is downloaded to the computing device 114 of the requesting user.

If the user needs technical assistance, denoted by selection of the request assistance soft-key 910, management function 316 presents the user with window 904(*c*). As shown with reference to FIG. 9, the user is requested to denote the type or assistance required from a pull-down menu of choices 928, enter a description of the question in field 930, and submit the request by selection of the submit soft-key 932, step 822. In response, the management function 316 forwards the message to an appropriate technical resource, which responds to the user's request. According to one embodiment, the response is in the form of an email message, while in alternate embodiments, the response may come in the form of a telephone call.

Request a Payment

Figure 10:
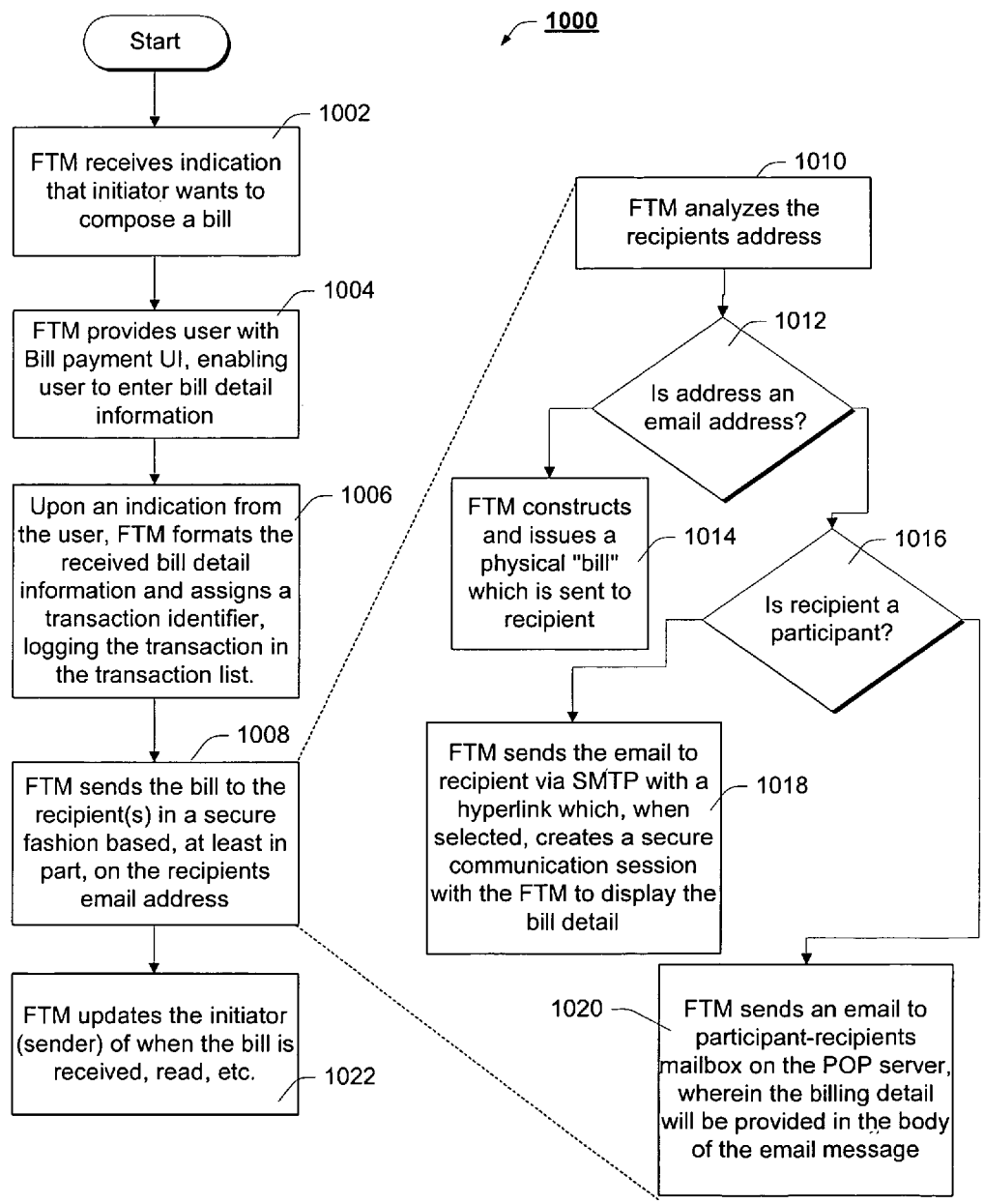
FIG. 10 is a flow chart of an example method for requesting a payment according to one embodiment of the present invention.
Figure 11:
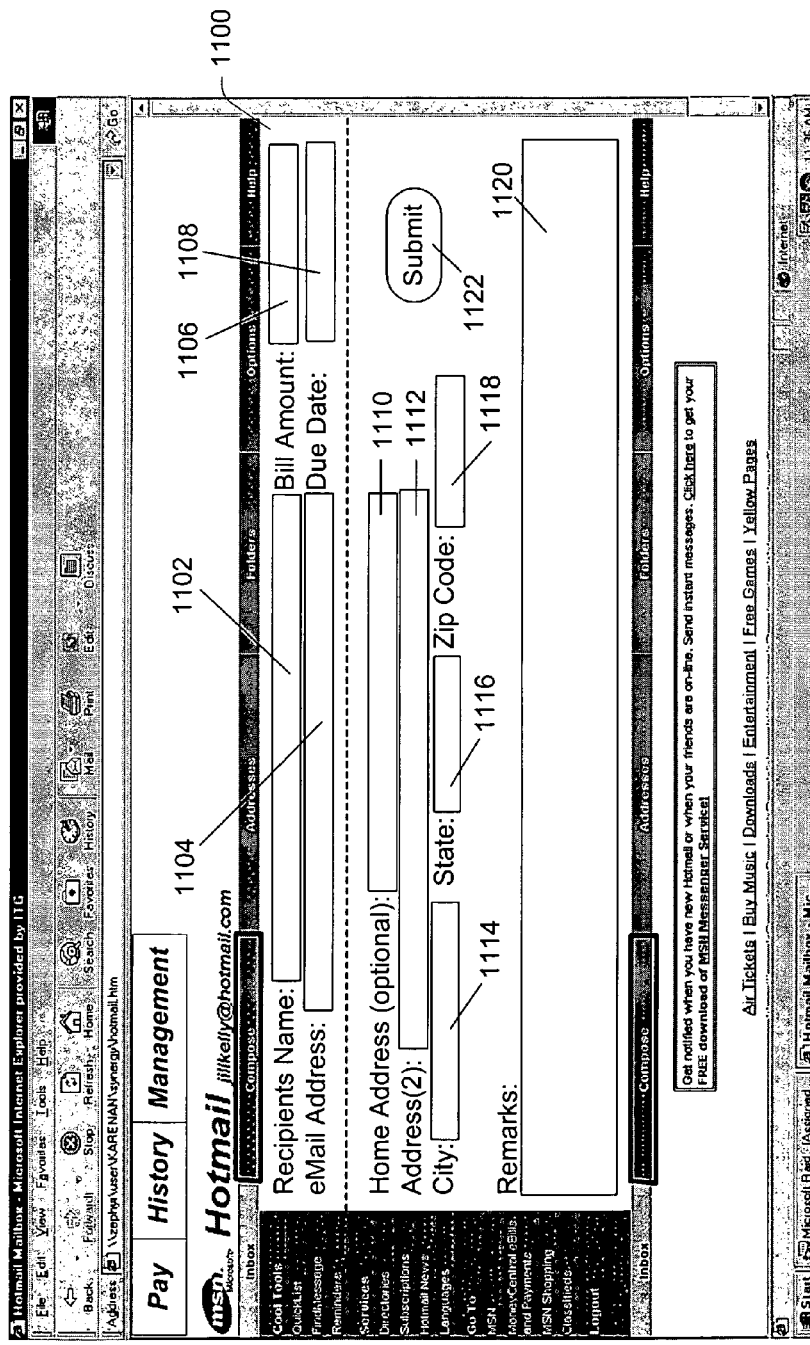
FIG. 11 is a graphical representation of an example user interface through which one may request a payment according to one implementation of the present invention.

Turning now to FIGS. 10-12, an example method and associated graphical user interface(s) for requesting a payment is presented, in accordance with the teachings of the present invention. With initial reference to FIG. 10, the method of requesting payment begins with selection of the compose function 720 of the email system user interface 700, step 1002. In response, FTM 116 invokes an instance of the request payment function 320 which provides the user with a user interface to enter bill detail information. An example of a suitable user interface associated with the request payment function 320 is presented with reference to FIG. 11.

Turning briefly to FIG. 11, a graphical representation of an example user interface 1100 to request a payment is presented, according to one embodiment of the present invention. As shown, the user interface enables the requesting user to identify the payer (debtor) by name 1102, and email address 1104, enter a requested amount due 1106, and the date upon which it is due 1108. If the payer (debtor) email address is not known, the requesting user may optionally enter a home address 1110, 1112, a city 1114, state 1116 and zip code 1118, and the request payment function 320 of FTM 116 will issue the payment request in a physical form, i.e., send the payer (debtor) a bill. In addition, UI 1100 includes a field 1120 which enables the requesting user to enter any remarks regarding the request, e.g., why the user is making the request.

Returning to FIG. 10, once the information in the UI has been completed, and the requesting user selects the submit soft-key 1122, the request payment function 320 formats the received bill detail into an email message, assigns a transaction identifier to the transaction, and enters the transaction information into the transaction records 600, step 1006. In step 1008, the request payment function 320 of FTM 116 sends the bill to the identified recipient(s) in a secure fashion based, at least in part, on the identified address of the recipient (s). More specifically, according to one implementation, the amount of (confidential) billing information that is contained in the message sent by the FTM 116 is governed by a measure of how secure the communication link is. If, for example, a physical bill is to be generated and sent to the recipient using a governmental mail service, substantially all of the bill data is included in the request. Similarly, if the request is to be made to another user of the system and, thus, the email message will not travel to un-secure email servers to get to the recipient, substantially all of the billing information is included in the request. If, alternatively, the domain of the email address indicates that the message will travel through un-secure email servers, then a mere link to a secure web-page is provided in the constructed email.

Accordingly, with reference to step 1010, FTM 116 analyzes the recipients address. In step 1012, a determination is made as to whether the address is an email address and, if not, FTM 116 constructs a physical bill containing substantially all of the bill information, which is sent to the recipient, step 1014. If, in step 1012 the address is an email address, FTM 116 determines whether the recipient is a user of email system 102. According to one embodiment, FTM 116 analyzes the domain name of the email address to make this determination. If the recipient is not a user of email system 102, FTM 116 sends the email to the recipient using the SMTP protocol with a hyperlink which, when selected, establishes a secure connection (e.g., HTTPS) with the FTM 116 to display the bill detail, step 1018. An example of such an email message is presented with reference to FIG. 12A.

Figure 12A:
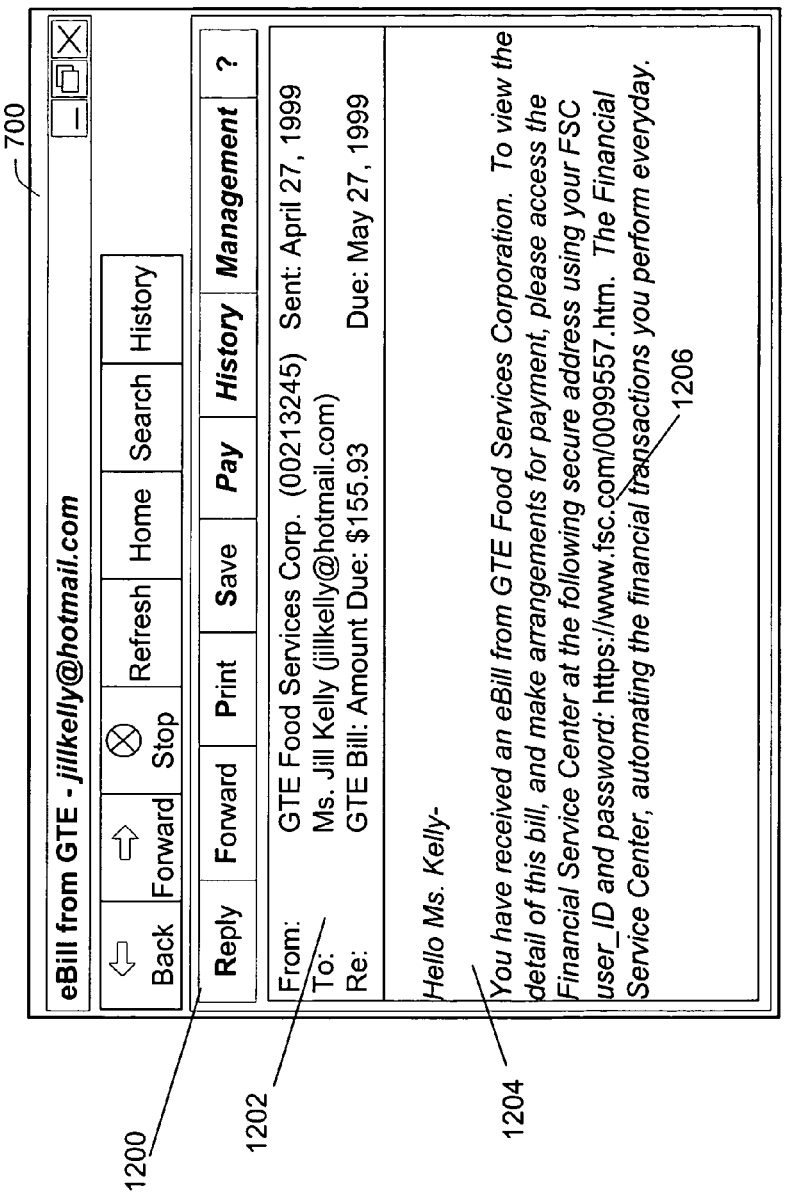

FIG. 12A graphically illustrates an example bill sent to one who is not a registered user of the innovative email system 102, according to one embodiment of the present invention. As shown, the email message includes a header 1202 and a body 1204. The header information 1202 identifies who issued the bill, how much is due and when the payment is due. The body 1204 contains a personalized message indicating that a bill has been received and includes an address to a secure web-page 1206 where the bill detail may be reviewed.

If, in step 1016 of FIG. 10, the recipient is a registered user of email system 102, FTM 116 sends an email to the participant-recipient's email system account, wherein the billing detail will be provided in the body of the email message. An example of such an email message is depicted in FIG. 12B.

FIG. 12B graphically represents an example payment request sent to and viewed by a registered user of the innovative email system 102, according to one embodiment of the present invention. As shown, the email message 1200 includes a header 1202 and a body 1208, wherein the body includes historical information regarding the account with the billing party, as well as an itemized list of information regarding the current bill.

Returning to FIG. 10, once FTM 116 has sent the request for payment, step 1008, the FTM updates the requesting user when the bill has been received, read, etc. by the payer (debtor), step 1022.

Payment Transaction

Figure 13:
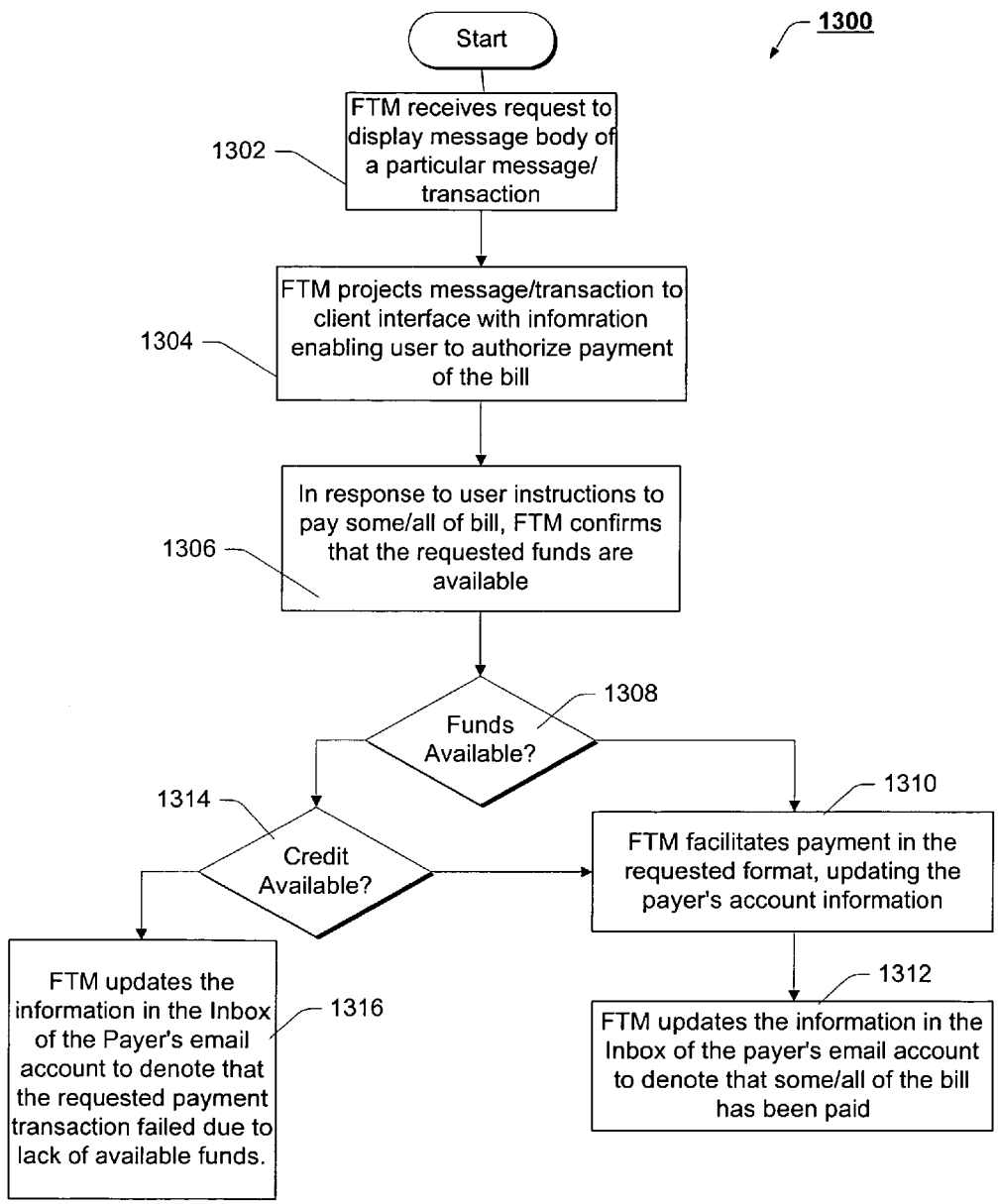
FIG. 13 is a flow chart of an example method for making a payment according to the teachings of the present invention.

With reference to FIG. 13, an example method for responding to a request for payment is presented, according to one implementation of the present invention. As shown, the method begins with step 1302 wherein FTM 116 receives a request to display an email message requesting payment denoted in a user's inbox (see, e.g., FIG. 9). In step 1304, in response to an indication from the user to authorize payment of at least a portion of the bill, controller 302 invokes an instance of the payment function 318 of FTM 116, which provides the user with a payment authorization user interface (see, e.g., 1400 in FIG. 14). In one embodiment, the user selects a "Pay" soft-key 706 to invoke the payment authorization interface 1400. An example of a suitable payment authorization user interface is presented with reference to FIG. 14.

Figures 14, 17:
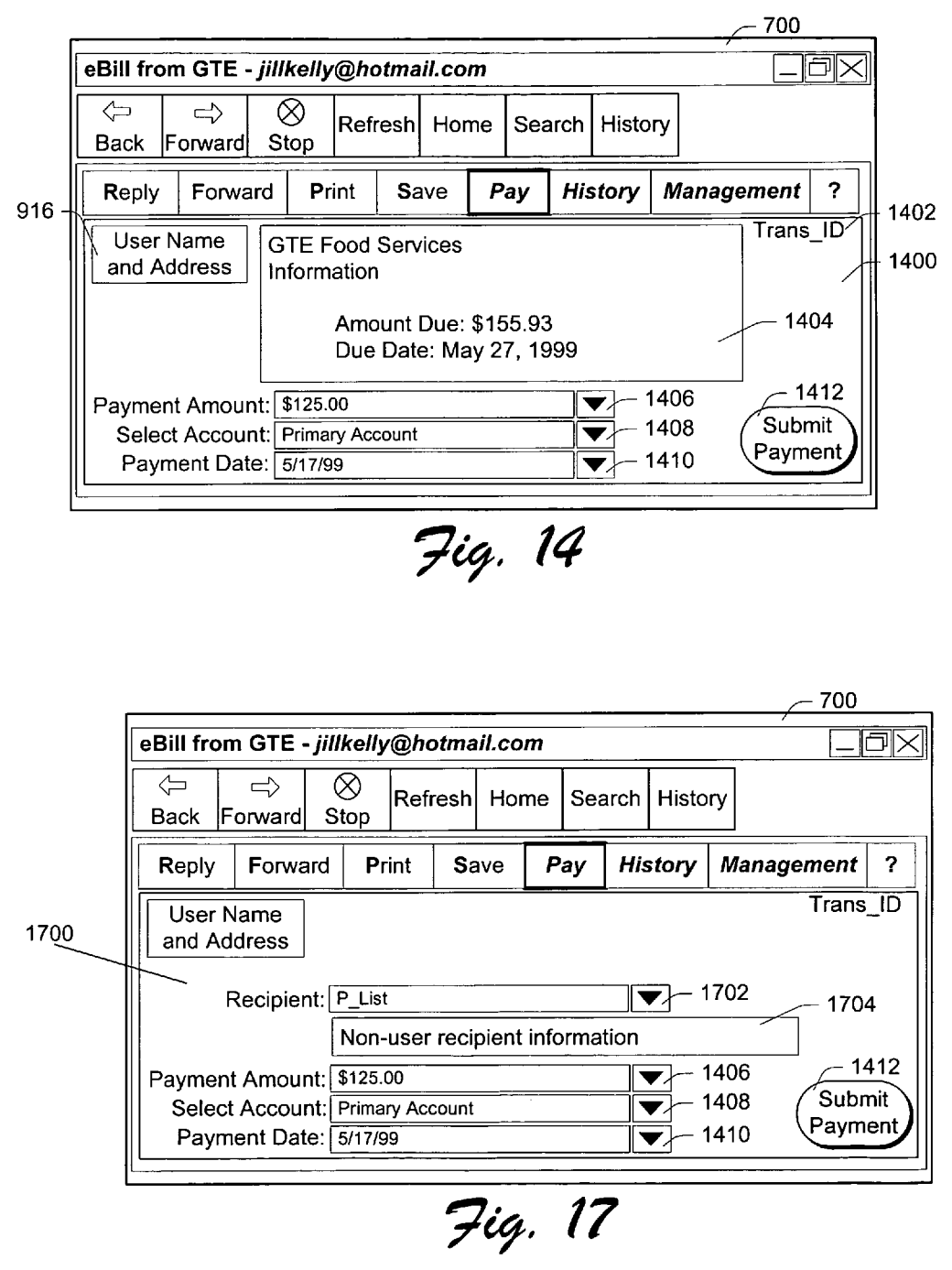

FIG. 14 graphically illustrates an example payment authorization user interface 1400, according to one embodiment of the present invention. As shown, the body 1400 of the payment authorization UI includes the FTM-assigned transaction identifier 1402, bill/biller information 1404, pull-down menus enabling the user to select a payment amount 1406, a payment account (i.e., an account from which the funds will be drawn) 1408, a payment date 1410, and a soft-key to initiate the payment transaction, 1412.

Once the user has provided the requested information in fields 1406-1410 and selected the submit payment soft-key 1412, payment function 318 accesses the financial account identified in field 1408 to confirm that the payment amount denoted in 1406 are available to cover the transaction. More specifically, controller 302 contacts the financial institution associated with the identified account using an appropriate financial institution interface 322 to confirm the availability of the requested funds. Based on the information received, payment function 318 determines whether adequate funds are available, step 1308. If so, payment function 318 facilitates payment in the requested format, updating the user's financial account information. In addition, payment function 318 updates the status field 610 of the transaction to denote that the identified funds have been pledged. Once the transaction clears the requestor's financial institution via the ACH, FTM 116 will again update the transaction status field 610, this time to denote that the transaction has cleared.

In step 1312, the payment function 318 updates the information in the Inbox of at least the authorizing user to denote that some/all of the bill has been paid. Rather than sending the authorizing user another email message to denote this update in the status of a bill/message, FTM 116 updates the original message with the current information. This is perhaps best seen with reference to FIG. 15.

Figure 15:
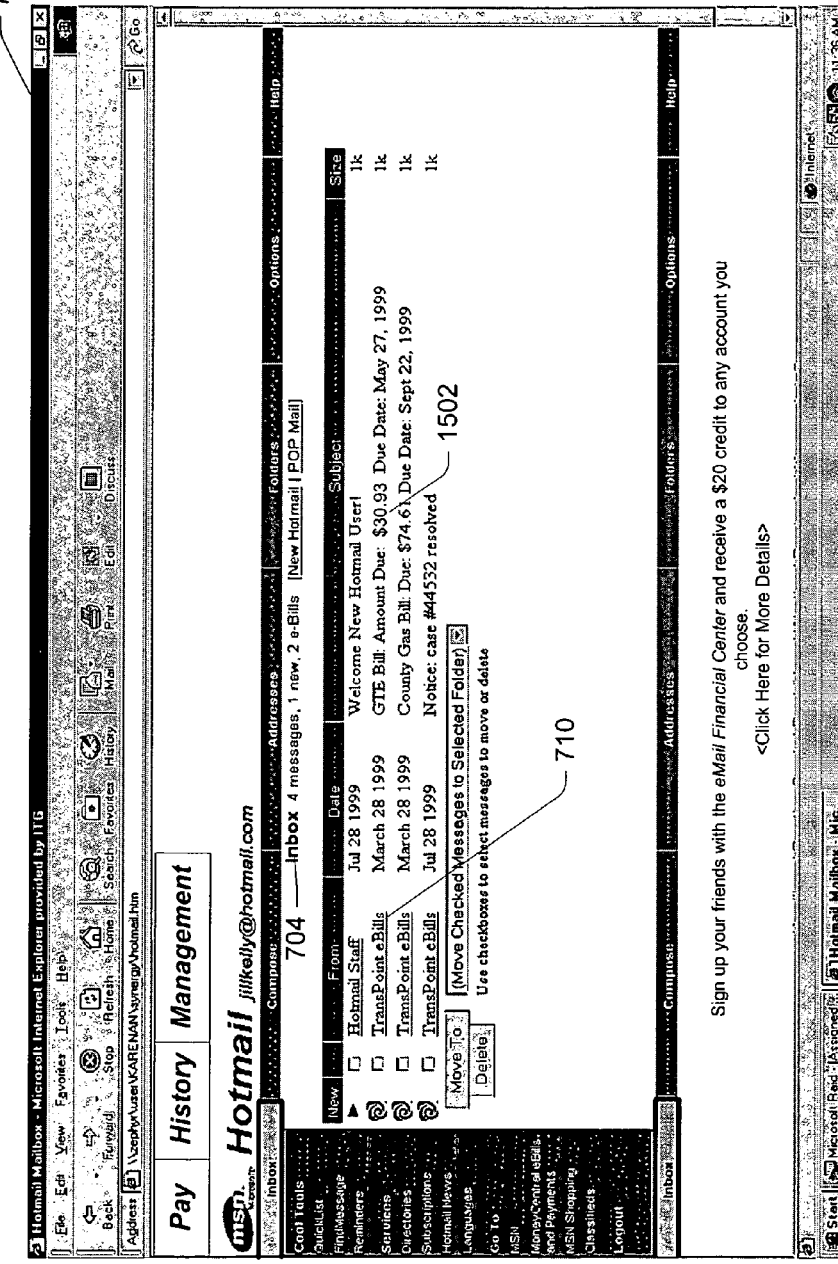
FIG. 15 is a graphical representation of the user interface of FIG. 7 updated to reflect that a payment for a bill has been made.

Turning briefly to FIG. 15, a graphical representation of a user's inbox is presented, wherein the status of a message has been updated to reflect a partial payment. More specifically, comparing the subject line of bill 716 first introduced in FIG. 7, to that depicted in FIG. 15, payment function 318 has updated the amount due to reflect the partial payment of $125.00. That is, the subject line 1502 of the bill 710 denotes an amount due of $30.93, from an original amount due of $155.93 (see FIG. 7). Indeed, according to certain implementations, a graphical attribute of a particular message denoted in a users Inbox will change to reflect the status of the message, i.e., open, pledged or cleared. According to one embodiment, the color of the text used to represent the message in the Inbox will change according to its status.

Returning to step 1308, if payment function 318 determines that insufficient funds are available, a further determination is made of whether to extend credit, step 1314. According to one implementation, the decision is made by payment function 318 based solely on whether the user has authorized the use of a credit account. In an alternate embodiment, the email system 102 may extend credit on its own accord based, at least in part, on the amount of money involved in the transaction, the amount of the overdraft, etc. In this embodiment, payment function 318 quantifies the credit risk of the user according to a growing trust model which, as described above, can take into account at least one or more of the amount of money involved, the number of transactions completed, and the length of time since account activation, and any of a number of additional factors.

If in step 1314 payment function authorizes the transaction, despite insufficient fund availability, the process continues with step 1310, and the transaction ultimately clears the payee's bank via the ACH system. If, in step 1314, payment function 318 cannot authorize the payment for lack of sufficient funds, payment function 318 updates the user's inbox to denote that the requested payment transaction has failed due to lack of funds, step 1316.

In addition to authorizing payment of a bill, a user of email system 102 may well initiate a payment to another, regardless of whether the recipient is a user of email system 102. Just such a method is presented with reference to FIGS. 16 and 17.

Figure 16:
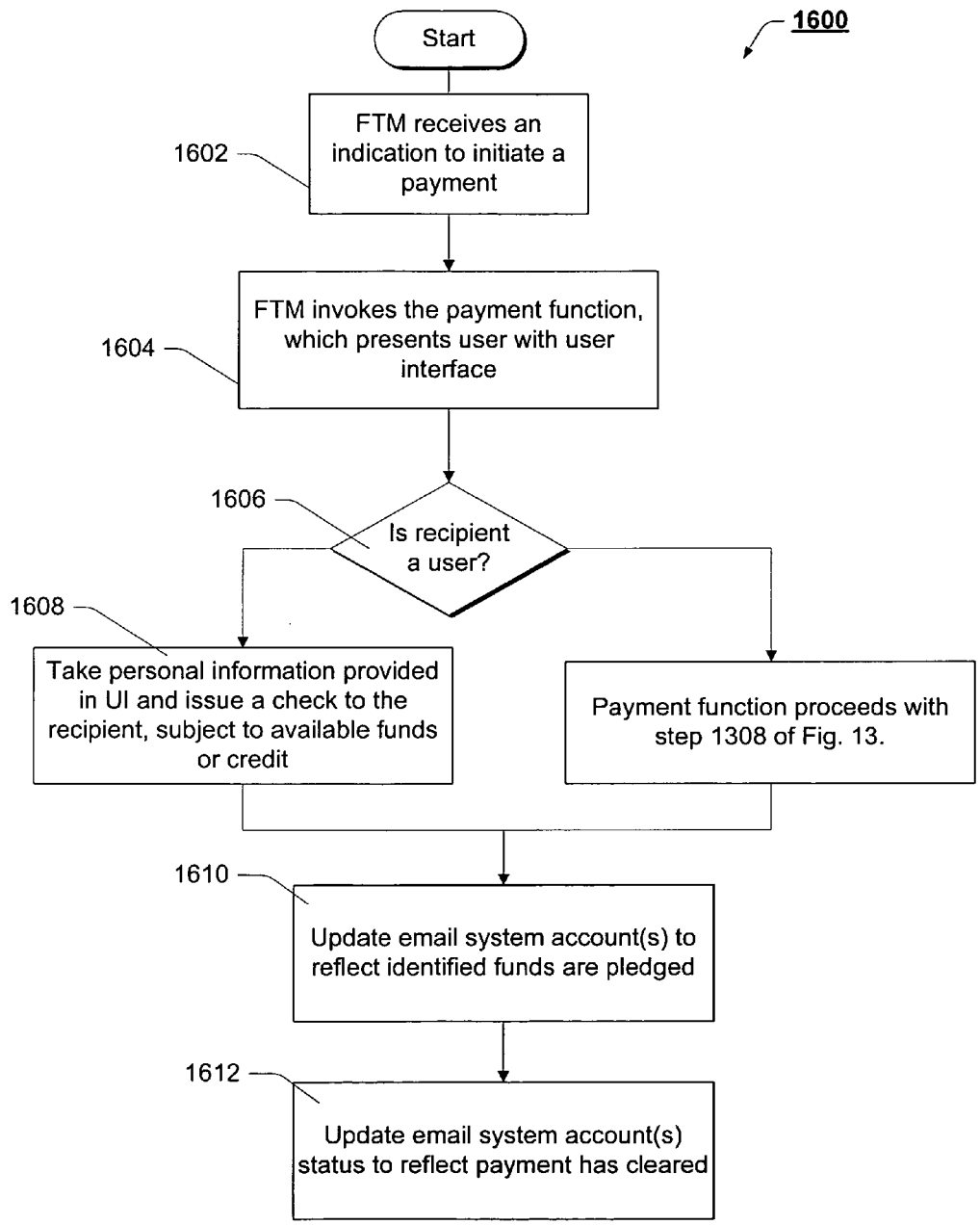
FIG. 16 is a flow chart of an example method for initiating a payment, according to one aspect of the present invention.

FIG. 16 illustrates a flow chart of an example method of initiating a payment using the innovative email system of the present invention. As shown, the method begins in step 1602, wherein FTM 116 receives an indication from the user to initiate a payment. In response, FTM 116 invokes an instance of payment function 318, step 1604. However, unlike the method of FIG. 13, no message/bill is selected when the user selects the "Pay" soft-key 706. Accordingly, payment function 318 provides the user with an initiate payment user interface. An example of just such an interface is presented with reference to FIG. 17.

As shown, FIG. 17 depicts an initiate payment user interface 1700 suitable for use in accordance with the present invention. The initiate payment interface 1700 includes a pull-down menu of past participants (the P_list) 1702 of financial transactions with the user. Alternatively, the user may identify a payee who is not a user of the email system 102 by providing payment function 318 with the payees personal information (minimally, a name and address), from which payment function 318 causes a check to be printed and sent to the intended recipient. UI 1700 also includes payment amount 1406, account selection 1408, payment date 1410 fields. A user finalizes the payment request by selecting the submit payment soft-key 1412.

Once payment function 318 receives the payment information from the user (e.g., upon user selection of the submit payment soft-key 1412), payment function 318 determines whether the intended recipient is a user of email system 102, step 1606. If so, payment function 318 proceeds to make the payment according to steps 1308 through 1316 of FIG. 13.

If, in step 1606, the intended recipient is not a user of email system 102, payment function 318 causes a physical check to be issued and sent to the intended recipient, subject to the availability of adequate funds or credit, step 1608. In particular, if a user is not selected from the P_list, and any email information provided in fields 1704 does not match that of a user of email system 102, payment function 318 causes a check to be printed. According to one implementation, printer 188 communicatively coupled to email system 102 prints the check, which is subsequently mailed to the intended recipient. An example of a check issued by payment function 318 is presented with reference to FIG. 18.

FIG. 18 graphically illustrates an example check 1800 issued by the financial transaction manager at the request of a user, according to one embodiment of the present invention. As shown, the check includes a negotiable section 1802 and a solicitation 1804 to register with email system 102. The negotiable section 1802 minimally includes information identifying the payee, the amount to be paid, and an account from which the amount is drawn. The solicitation section 1804 is depicted including information (e.g., a web page, a telephone number, etc.) 1806 where the recipient can register for the email system 102.

Regardless of the form of the payment, the process continues with, in step 1610, payment function 318 creating a transaction record to denote that the identified funds have been pledged. Subsequently, in step 1612, payment function updates the created transaction record to reflect a cleared status when the funds have cleared through payees financial institution.

Alternate Embodiments

FIG. 19 is a block diagram of a storage medium having stored thereon a plurality of instructions including instructions to implement the teachings of the present invention, according to yet another embodiment of the present invention. In general, FIG. 19 illustrates a storage medium/device 1900 having stored thereon a plurality of executable instructions 1902 including at least a subset of which that, when executed, implement the email system 102 with innovative financial transaction manager 116 of the present invention. When executed by a processor of a host system, the executable instructions implementing email system 102 with FTM 116 facilitate a plurality of financial transactions among and between any user of the email system, as well as from a user to a non-user of the email system. In this regard, execution of the subset of instructions 1902 implementing the email system 102 facilitate implementation of an innovative ubiquitous financial network 100.

As used herein, storage medium 1900 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, eXtensible Markup Language (XML), and the like. Moreover, it is to be appreciated that the storage medium/device 1900 need not be co-located with any host system. That is, storage medium/device 1900 may well reside within a remote server communicatively coupled to and accessible by an executing system. Accordingly, the software implementation of FIG. 19 is to be regarded as illustrative, as alternate storage media and software embodiments are anticipated within the spirit and scope of the present invention.

Figure 20:
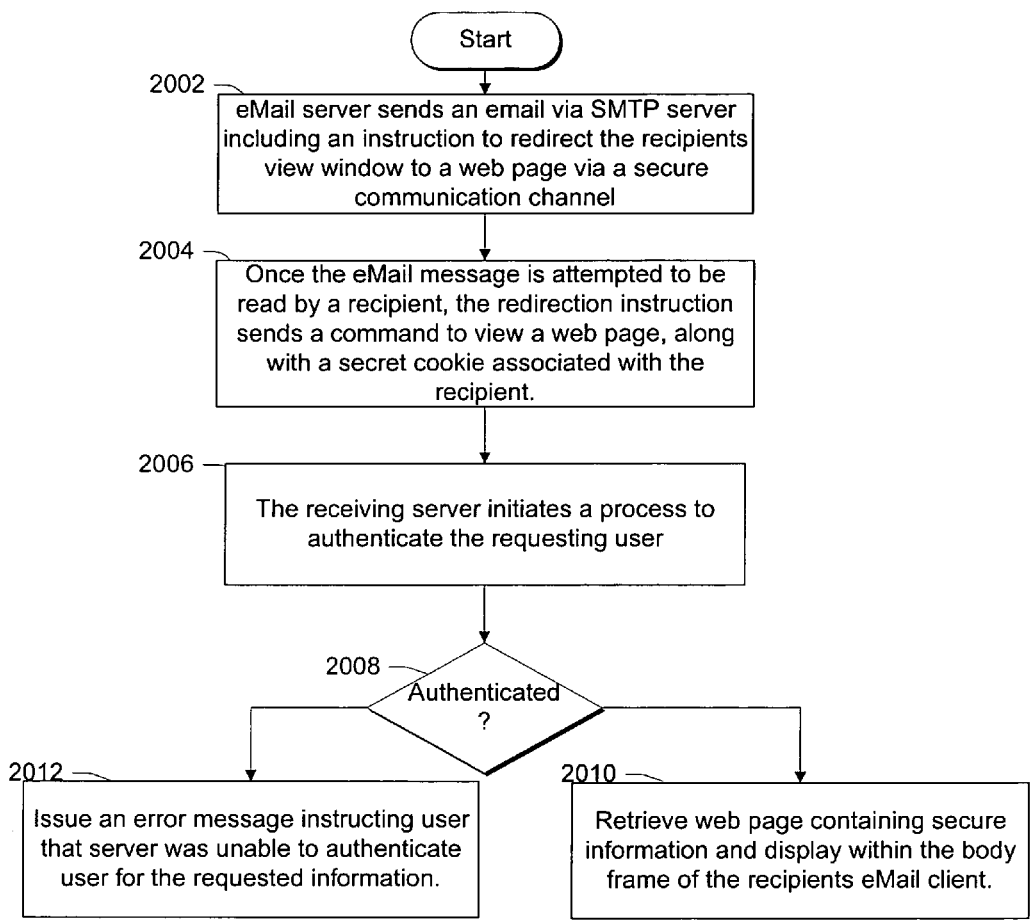
FIG. 20 is a flow chart of an example method for securely distributing an email via an SMTP-based email system, according to one aspect of the present invention.

FIG. 20 is a flow chart of an example method for establishing a secure communication channel using SMTP servers, according to one aspect of the present invention. As shown, the method begins with block 2002, wherein the email server sends an HTML email via an SMTP server to a client computer (e.g., of a user or non-user). In accordance with this embodiment of the present invention, the email body includes an instruction (e.g., a frameset tag) that is sourced to a secure server providing or otherwise associated with FTM 116. According to one implementation, the email contains not only an HTML body but also a backup text body (for user's whose email client does not support HTML), which would provide the user with the uniform resource locator (URL) address where the secure email message can be obtained/viewed. Example code for facilitating transmission of secure email via an SMTP server is provided in the table below.

<HTML>
<FRAMESET>
<FRAME SRC="https://www.msnf.com/jupiter/mail/get_mail.asp?auth=0xad64357465de656b">
</FRAMESET>
</HTML>

Table I: Example Code Establishing Secure eMail Viewing Channel

According to the illustrated example embodiment above, the URL is protected from hacking via the SSL encryption and the email client will automatically call the get_mail.asp page when the email is opened to try and resolve the frameset tag. According to one implementation, the "auth" parameter includes one or more authentication identifiers such as, for example, the userID, an eMailID, a date/time stamp of when the email was sent (e.g., facilitating timeouts after a prescribed number of hours, days, etc.). The authentication parameter is encrypted with the encryption key maintained by security agent 310.

In block 2004, to protect the email, the frameset tag call to the get_mail.asp is accompanied by the cookie that contains the user's secret key (provided by security agent 310). According to one implementation, the secret cookie contains a large random number that is used to encrypt/decrypt the auth URL parameter.

In block 2006, the get_mail.asp processes the call by taking the cookie and decrypting the auth parameter. In block 2008, if the auth parameter is validated, then the page redirects the user's message, which is displayed in the view window of the user's email client as if it were the body of the originally received email. If, in block 2010, any of the authentication parts fail, an error message is issued. According to one implementation, if the authentication fails, a record of the unsuccessful accessing user is maintained for security purposes.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

The invention claimed is:

1. A method comprising:
   constructing a message including an interface which, when executed, establishes a secure communication channel through which a web page is received to securely display information in a view window within a body of the message such that the information and at least a portion of the message are to be displayed concurrently; and
   sending the constructed message to an appropriate bill recipient.

2. A method according to claim 1, wherein the interface is a call to an application service provider (ASP) hosting electronic bill presentment and payment (EBPP) services.

3. A method according to claim 2, wherein the call to the application service provider is accompanied by information that contains a secret key associated with the bill recipient.

4. A method according to claim 3, wherein the information is included in a cookie.

5. A method according to claim 3, wherein the secret key is uniquely assigned to the bill recipient upon registering with the application service provider.

6. A method according to claim 3, wherein the information includes one or more of an identifier of the bill recipient, an email address of the bill recipient, and/or a date-time stamp of when the message was sent.

7. A method according to claim 3, wherein the secret key is generated in accordance with a pretty good privacy (PGP) encryption schema.

8. A method according to claim 1, wherein the interface is an HTML frameset tag.

9. A method according to claim 1, wherein the interface includes an identifier of the intended billing recipient.

10. A method according to claim 1, wherein the sending the constructed message comprises:
    sending the constructed message only if the constructed message is not to travel through an un-secure server; and
    sending another message that includes two message bodies, wherein a first message body of the other message includes an interface, and wherein a second message body of the other message includes a text message denoting an address for manually establishing a secure communication channel if the message is to travel through an un-secure server.

11. A method according to claim 10, wherein the address is a uniform resource locator (URL).

12. A method according to claim 10, wherein the first message body of the other message is generated using hypertext markup language (HTML) instructions, which when rendered by a browser executing on a receiving computing system, includes the interface to establish the secure communication channel.

13. A method according to claim 10, wherein the interface is an HTML frameset tag to server comprising billing information destined for the user.

14. A method according to claim 1, wherein secure communication channel is established using a secure socket layer (SSL) connection.

15. A method according to claim 1, further comprising:
    receiving a request for billing information, automatically generated upon activation of the sent message by the user; and
    establishing a secure communication channel with a computing system of the user to provide billing information in the view window within the body of the message upon authentication of the user.

16. A method according to claim 15, wherein the request includes an authentication parameter comprising one or more of a consumer identifier, an email address, a date-time stamp, and a computing system identifier.

17. A method according to claim 16, wherein the authentication parameter is included in a cookie accompanying the request.

18. A method according to claim 16, wherein establishing a secure communication channel to provide billing information further comprises:
    retrieving billing information associated with the user based, at least in part, on the received authentication parameters;
    sending the retrieved billing information to the user over a secure socket layer (SSL) communication channel.

19. A method according to claim 1, wherein the constructing comprises:
    receiving bill data; and
    including at least a portion of the bill data in the message, wherein the amount of bill data included in the message is based at least in part on an email address of the bill recipient.

20. A method according to claim 19, wherein the amount of bill data included in the message is further based at least in part on how secure a link to the bill recipient is.

21. A computing system comprising:
    a storage medium including a plurality of executable instructions; and
    an execution unit, coupled to the storage medium, to selectively execute at least a subset of the plurality of executable instructions to implement a method according to claim 1.

22. An electronic bill payment and presentment system comprising:
    a network interface, to communicatively couple the system to a network; and
    an email generator, to construct a message including an interface which, when executed, establishes a secure communication channel through which a web page is received to securely display information in a view window within a body of the message such that the information and at least a portion of the message are to be displayed concurrently.

23. A system according to claim 22, wherein the information includes electronic billing information.

24. A system according to claim 22, wherein the email generator sends the constructed message to a user via the simple mail transfer protocol (SMTP) system.

25. A system according to claim 22, wherein the interface includes a call to web server via a secure socket layer (SSL) connection.

26. A system according to claim 25, wherein the message includes authentication parameters to authenticate the user to the web server.

27. A system according to claim 22, further comprising:
a web server, coupled to the network, to receive the request for the web page, authenticate the requesting user, and download the web page to the view window within the body of the message.

28. A system according to claim 27, wherein the web server hosts the email generator.

29. A method comprising:
receiving an electronic mail message, wherein the electronic mail message includes an interface; and
establishing, via the interface, a secure communication channel through which a web page is received to securely display information in a view window within a body of the electronic mail message such that the information and at least a portion of the electronic mail message are to be displayed concurrently.

30. A method according to claim 29, further comprising displaying the electronic mail message to a user.

31. A method according to claim 29, wherein the interface is a call to an application service provider (ASP) hosting electronic bill presentment and payment (EBPP) services.

32. A method according to claim 31, wherein the call to the application service provider is accompanied by information that contains a secret key associated with a bill recipient.

33. A method according to claim 32, wherein the secret key is uniquely assigned to the bill recipient upon registering with the application service provider.

34. A method according to claim 32, wherein the information includes one or more of an identifier of the bill recipient, an email address of the bill recipient, and a date-time stamp of when the electronic mail message was sent.

35. A method according to claim 29, wherein the interface is a hypertext markup language (HTML) frameset tag.

36. A method according to claim 29, further comprising:
automatically generating, upon activation of the electronic mail message, a request for billing information; and
establishing the secure communication channel with a computing system to provide billing information in the view window within the body of the electronic mail message.

37. One or more computer readable memory devices having stored thereon a plurality of instructions that, when executed by one or more processors, causes the one or more processors to:
receive a request for billing information; and
establish a secure communication channel with a computing system of the bill recipient to provide billing information for secure display to the bill recipient in a view window within a body of a message upon authentication of the bill recipient such that the information and at least a portion of the message are to be displayed concurrently.

38. One or more computer readable memory devices according to claim 37, wherein the request includes an authentication parameter comprising one or more of a consumer identifier, an email address, a date-time stamp, and a computing system identifier.

39. One or more computer readable memory devices according to claim 38, wherein the authentication parameter is included in a cookie accompanying the request.

40. One or more computer readable memory devices according to claim 38, wherein the instructions that cause the one or more processors to establish a secure communication channel to provide billing information further cause the one or more processors to:
retrieve billing information associated with the bill recipient based, at least in part, on the received authentication parameters; and
send the retrieved billing information to the bill recipient over a secure socket layer (SSL) communication channel.

41. One or more computer readable memory devices having stored thereon an electronic mail message data structure, comprising:
a first portion identifying a bill recipient that is to receive the electronic mail message; and
a second portion including an interface that, when executed, establishes a secure communication channel through which a web page corresponding to the bill recipient identified in the first portion is received, wherein the billing information for the bill recipient is displayed in a view window within a body of the electronic mail message concurrently with at least a portion of the electronic mail message.

42. A computer readable memory devices according to claim 41, wherein the interface is a call to an application service provider (ASP) hosting electronic bill presentment and payment (EBPP) services.

43. One or more computer readable memory devices having stored thereon a plurality of instructions that, when executed by one or more processors, causes the one or more processors to output a graphical user interface comprising:
a first portion identifying a bill recipient that is to receive a message, wherein the graphical user interface is included in the message; and
a second portion including one or more instructions which, when executed, establish, if the message is not to travel through an un-secure server, a secure communication channel through which a web page is received to securely display information in a view window within a body of the message such that the information and at least a portion of the message are to be displayed concurrently.

44. A method for communicating bill information over a secure email system by a user of the secure email system, the method comprising:
constructing a message including an interface which, when executed, establishes a secure communication channel through which a web page is received to securely display information in a view window within a body of the message such that the information and at least a portion of the message are to be displayed concurrently; and
sending the constructed message to an appropriate bill recipient over the secure email system, wherein the recipient is a non-user of the secure email system, wherein non-users have not registered for a service of the secure email system.

45. The method of claim 44, wherein the recipient does not have an account on the secure email system.

46. The method of claim 44, further comprising receiving a bill via the secure email system.

47. The method of claim 1, wherein the constructing comprises determining whether the message is to travel through an un-secure server; providing a link to a secure web page instead of the information to be displayed in the view window within the body of the message in response to determining the message is to travel through an un-secure server; and enabling the interface to establish the secure communication channel in response to determining the message is not to travel through an un-secure server.

\* \* \* \* \*